US012330793B2

(12) United States Patent
Hoover

(10) Patent No.: US 12,330,793 B2
(45) Date of Patent: Jun. 17, 2025

(54) METHOD FOR TRANSLATING PINS USING A ROTARY ACTUATOR

(71) Applicant: AMI Industries, Inc., Colorado Springs, CO (US)

(72) Inventor: Douglas E. Hoover, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 535 days.

(21) Appl. No.: 17/948,043

(22) Filed: Sep. 19, 2022

(65) Prior Publication Data

US 2024/0092488 A1  Mar. 21, 2024

(51) Int. Cl.
  *B60N 2/42*  (2006.01)
  *B64D 11/06*  (2006.01)
  *F16F 7/12*  (2006.01)
  *B60N 2/427*  (2006.01)

(52) U.S. Cl.
  CPC ...... *B64D 11/0619* (2014.12); *B64D 11/0648* (2014.12); *F16F 7/123* (2013.01); *B60N 2/42736* (2013.01); *B64D 11/0689* (2013.01)

(58) Field of Classification Search
  CPC .. F16F 7/123; B64D 11/0619; B64D 11/0648; B64D 11/0689; B64D 25/04; B60N 2/42709; B60N 2/42736; Y10T 74/20636
  See application file for complete search history.

(56) References Cited

U.S. PATENT DOCUMENTS

| | | | | |
|---|---|---|---|---|
| 3,714,893 | A * | 2/1973 | Cole | B65H 20/04 74/568 R |
| 5,706,704 | A * | 1/1998 | Riefe | F16F 7/125 188/371 |
| 8,550,224 | B2 * | 10/2013 | Bauer | B60N 2/42736 188/371 |
| 8,573,372 | B2 * | 11/2013 | Humfeldt | F16F 7/128 188/374 |
| 8,807,294 | B2 * | 8/2014 | Hsieh | F16D 65/28 188/161 |
| 9,447,614 | B2 | 9/2016 | Ishihara et al. | |
| 10,486,732 | B2 * | 11/2019 | Schädlich | F16F 7/123 |
| 11,945,590 | B1 * | 4/2024 | Pacheco | B60N 2/42709 |
| 12,122,521 | B2 * | 10/2024 | Pacheco | B64D 11/0689 |
| 2008/0309120 | A1 * | 12/2008 | Kohlstrand | E05F 5/00 296/146.11 |

(Continued)

FOREIGN PATENT DOCUMENTS

BR  112015024227 B1  12/2021
WO  2007093283 A1  8/2007

*Primary Examiner* — Bradley T King
(74) *Attorney, Agent, or Firm* — Suiter Swantz IP

(57) ABSTRACT

An assembly for an energy attenuation system is described. The assembly offers a lower profile configuration that fits better into tight spaces that exist in the compact seats that are required for military helicopters. The assembly includes a cable that is oriented and positioned to work with the profile. The assembly includes an actuator which ejecting the pins in a multi-stage sequence. The design of the assembly also ensures the pins cannot back drive when the pins are in the ejected position. Additionally, the pins may have part commonality reducing a unique part of the assembly.

20 Claims, 17 Drawing Sheets

(56) References Cited

U.S. PATENT DOCUMENTS

| | | | |
|---|---|---|---|
| 2009/0235767 A1* | 9/2009 | Garneau | E05B 47/0012 |
| | | | 292/201 |
| 2009/0301832 A1* | 12/2009 | Humfeldt | B64C 1/062 |
| | | | 188/371 |
| 2010/0096230 A1* | 4/2010 | Humfeldt | F16F 7/123 |
| | | | 188/371 |
| 2016/0244015 A1* | 8/2016 | Dubay | B60R 21/02 |
| 2020/0398885 A1* | 12/2020 | Pichonnat | B62D 1/195 |
| 2023/0144561 A1* | 5/2023 | Pacheco | B64D 25/04 |
| | | | 244/118.6 |
| 2025/0033777 A1* | 1/2025 | Hoover | B64D 11/0689 |

* cited by examiner

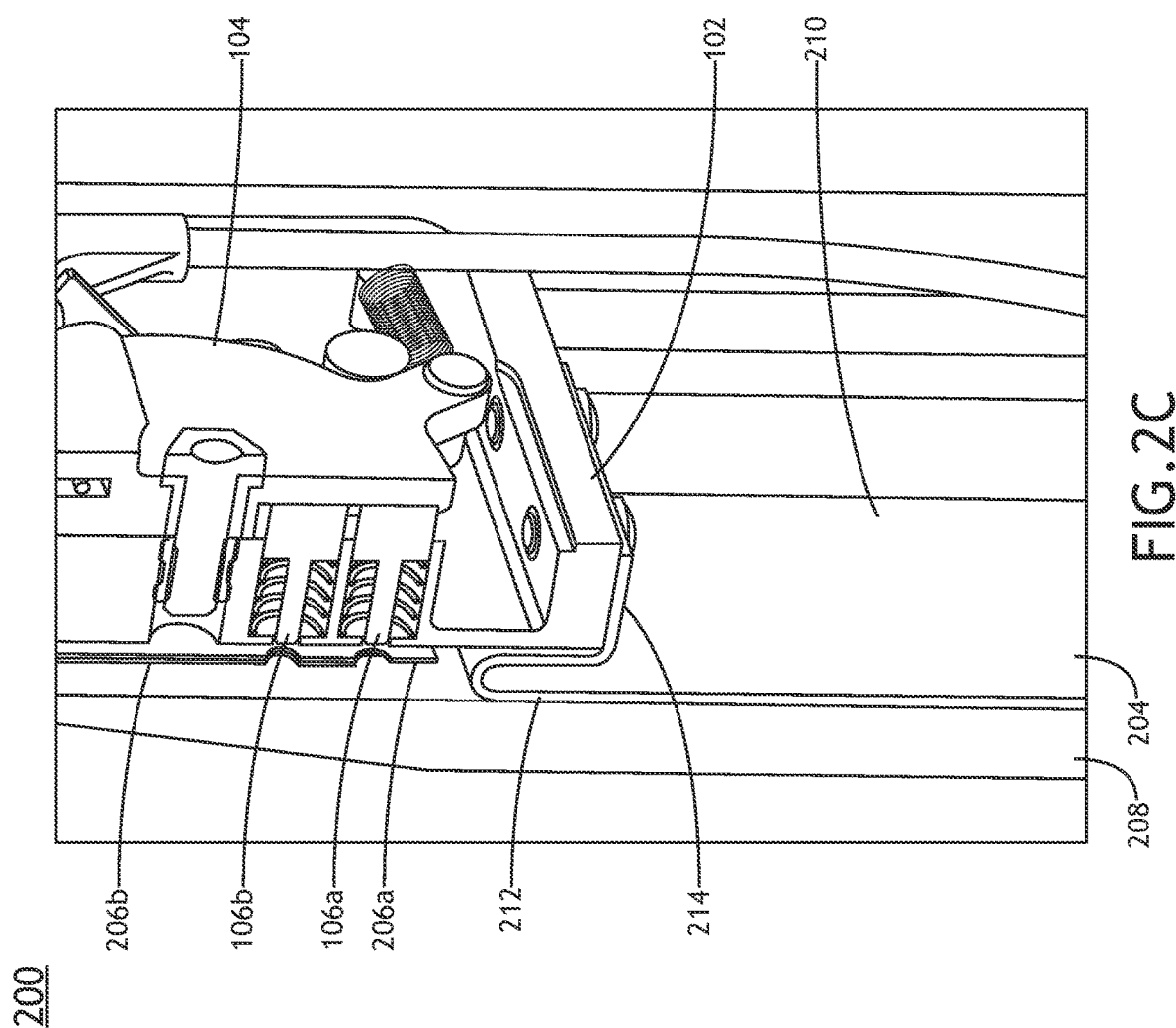

METHOD FOR TRANSLATING PINS USING A ROTARY ACTUATOR

TECHNICAL FIELD

The present invention generally relates to seating and more specifically to energy absorption systems for the seating.

BACKGROUND

Vehicles may experience high impact events. For example, helicopters may experience high impact events during landing. During the impact event, an operator sitting in a seat of the helicopter may experience high lumbar loads. Seats within the helicopter may be designed with energy attenuation systems for attenuating the energy during the impact events to reduce the lumbar loads to at or below a given tolerance. A weight of the operator sitting in the seat may vary between a wide range of values. The weight of the operator is an important design consideration for the energy attenuation system. A lower attenuation is desired for the energy attenuation system when a lightweight occupant is seated, as compared to a mediumweight occupant. Failing to accommodate for the lightweight occupant may cause the energy attenuation system to undergo minimal attenuation. The occupant may then experience lumbar loads due to the seat not sufficiently attenuating the force. Similarly, a higher attenuation is desired for the energy attenuation system when a heavyweight occupant is seated, as compared to a mediumweight occupant. Failing to accommodate for the heavyweight occupant may cause the energy attenuation system to be under-attenuated, allow the seat to translate downwards too rapidly, and potentially allow the seat to hit the floor of the helicopter. Therefore, some level of adjustability in the energy attenuation system is desirable to accommodate for a weight of the operator. A number of energy attenuation systems exist which allow for adjusting the amount of attenuation according to the weight of the operator. The previous energy attenuation systems may be advantageous in allowing operators with a wide weight range to safely sit in the same seat.

Helicopter seating configurations may be based, in part, on the helicopter platform. Advancements in the helicopter platforms may be such that the previous energy attenuation systems are unable to fit within the platform. For example, the previous energy attenuation systems may be too tall to fit into the spaces required for new helicopter seating configurations. For example, the seat may be pushed up against a back bulkhead wall. Because the seat is so close to that bulkhead wall, design advancements may be needed to make the energy attenuation system of the seat compact longitudinally. Therefore, it would be advantageous to provide a device, system, and method that cures the shortcomings described above.

SUMMARY

An assembly is described, in accordance with one or more embodiments of the present disclosure. In some embodiments, the assembly includes a carriage defining a first hole and a second hole. In some embodiments, the assembly includes a rotary actuator rotatably coupled to the carriage by which the rotary actuator is configured to rotate relative to the carriage between a first angular position, a second angular position, and a third angular position. In some embodiments, the rotary actuator includes a cam profile. In some embodiments, the assembly includes a first pin, wherein at least a portion of the first pin is disposed in the first hole. In some embodiments, the assembly includes a first compression spring coupled between the carriage and the first pin. In some embodiments, the first compression spring abuts the first pin against the cam profile. In some embodiments, the assembly includes a second pin. In some embodiments, at least a portion of the second pin is disposed in the second hole. In some embodiments, the assembly includes a second compression spring coupled between the carriage and the second pin. In some embodiments, the second compression spring abuts the second pin against the cam profile. In some embodiments, the assembly includes a cable coupled to the rotary actuator. In some embodiments, the cable causes the rotary actuator to rotate between the first angular position, the second angular position, and the third angular position. In some embodiments, the cam profile translates the first pin relative to the first hole as the rotary actuator rotates from the first angular position to the second angular position. In some embodiments, the cam profile translates the second pin relative to the second hole as the rotary actuator rotates from the second angular position to the third angular position. In some embodiments, the assembly includes an extension spring coupled between the carriage and the rotary actuator. In some embodiments, the extension spring is configured to return the rotary actuator to the first angular position.

A system is described, in accordance with one or more embodiments of the present disclosure. In some embodiments, the assembly includes a carriage defining a first hole and a second hole. In some embodiments, the assembly includes a rotary actuator rotatably coupled to the carriage by which the rotary actuator is configured to rotate relative to the carriage between a first angular position, a second angular position, and a third angular position. In some embodiments, the rotary actuator includes a cam profile. In some embodiments, the assembly includes a first pin, wherein at least a portion of the first pin is disposed in the first hole. In some embodiments, the assembly includes a first compression spring coupled between the carriage and the first pin. In some embodiments, the first compression spring abuts the first pin against the cam profile. In some embodiments, the assembly includes a second pin. In some embodiments, at least a portion of the second pin is disposed in the second hole. In some embodiments, the assembly includes a second compression spring coupled between the carriage and the second pin. In some embodiments, the second compression spring abuts the second pin against the cam profile. In some embodiments, the assembly includes a cable coupled to the rotary actuator. In some embodiments, the cable causes the rotary actuator to rotate between the first angular position, the second angular position, and the third angular position. In some embodiments, the cam profile translates the first pin relative to the first hole as the rotary actuator rotates from the first angular position to the second angular position. In some embodiments, the cam profile translates the second pin relative to the second hole as the rotary actuator rotates from the second angular position to the third angular position. In some embodiments, the assembly includes an extension spring coupled between the carriage and the rotary actuator. In some embodiments, the extension spring is configured to return the rotary actuator to the first angular position. In some embodiments, the system includes a lever coupled to the cable. In some embodiments, the system includes a seat member. In some embodiments, the system includes at least a first sheet and a second sheet. In some embodiments, the system includes a deformable member coupled between the seat member and the carriage. In some embodiments, the deformable member is configured to deform for attenuating energy as the carriage translates downwards relative to the seat member.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 2C depicts a partial view of a system with a deformable member prior to deformation, in accordance with one or more embodiments of the present disclosure.

FIG. 2I depicts a partial view of a system with a deformable member prior to deformation with a first pin engaging a first sheet and a second pin engaging a second sheet, in accordance with one or more embodiments of the present disclosure.

DETAILED DESCRIPTION OF THE INVENTION

Figure 1A:
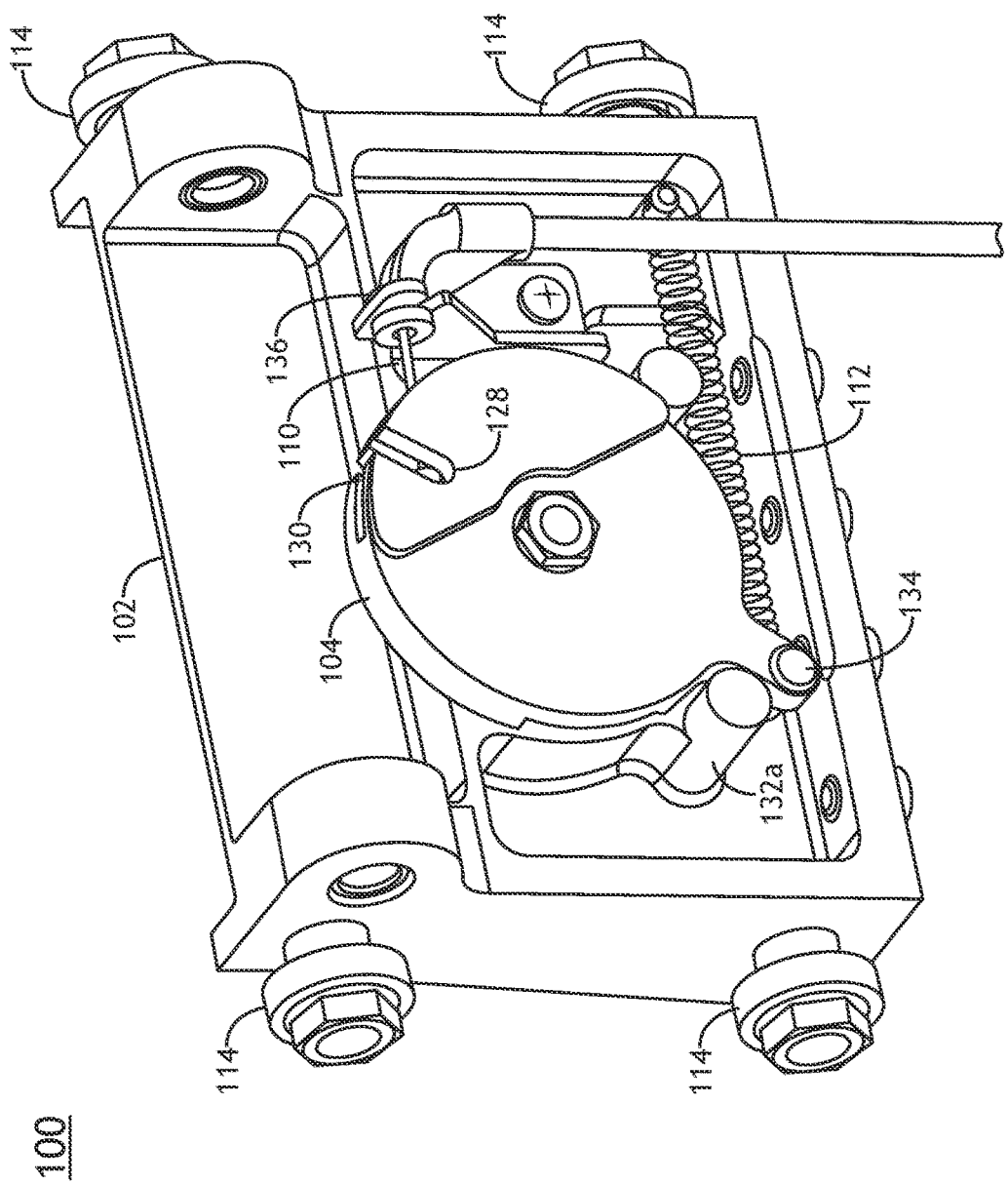
FIG. 1A depicts a perspective view of an assembly, in accordance with one or more embodiments of the present disclosure.
Figure 1B:
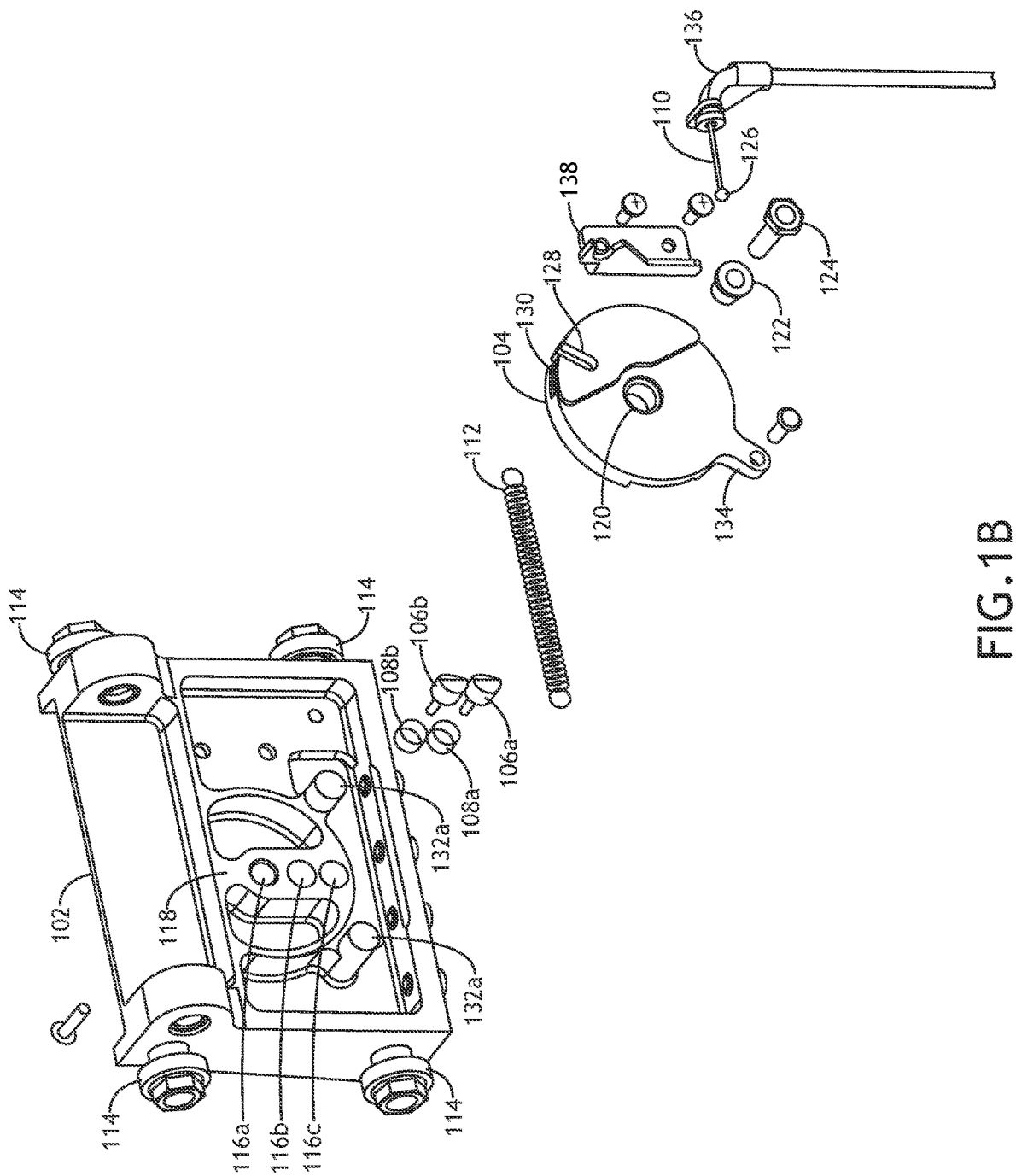
FIG. 1B depicts an exploded view of an assembly, in accordance with one or more embodiments of the present disclosure.
Figure 1C:
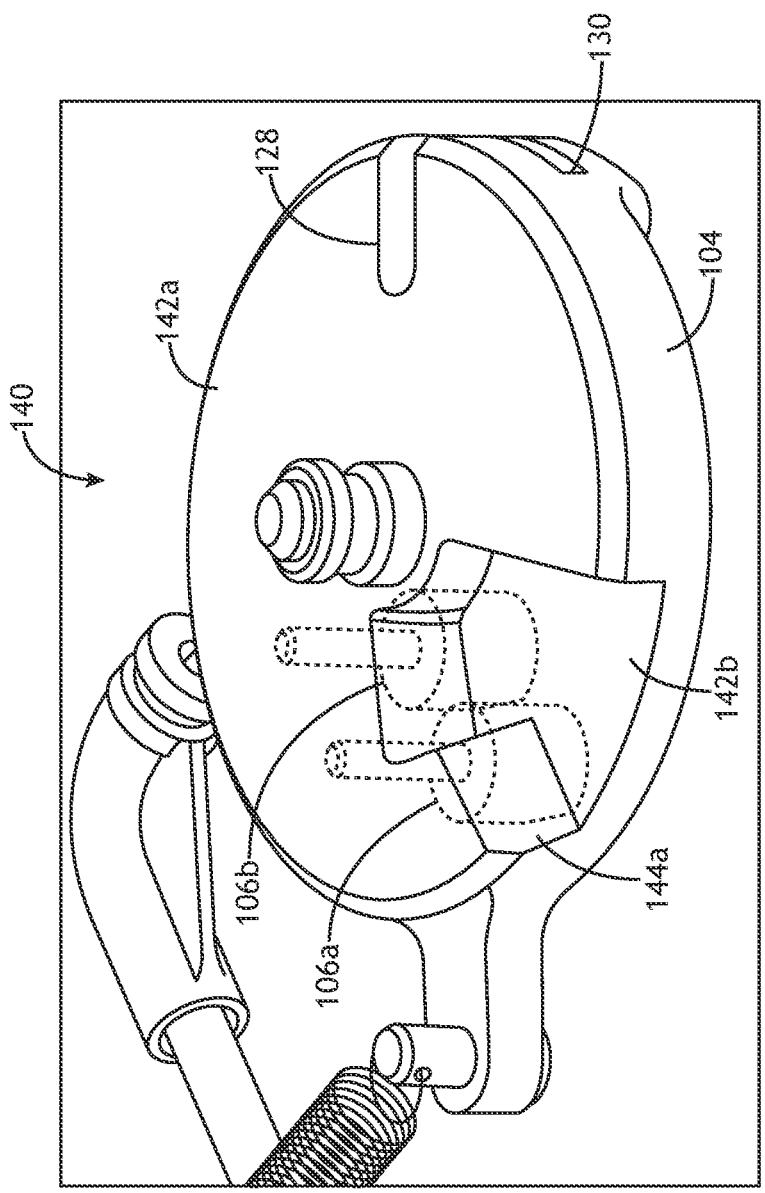
FIG. 1C depicts a partial perspective view of an assembly with a rotary actuator and a set of pins in an undepressed position, in accordance with one or more embodiments of the present disclosure.
Figure 1D:
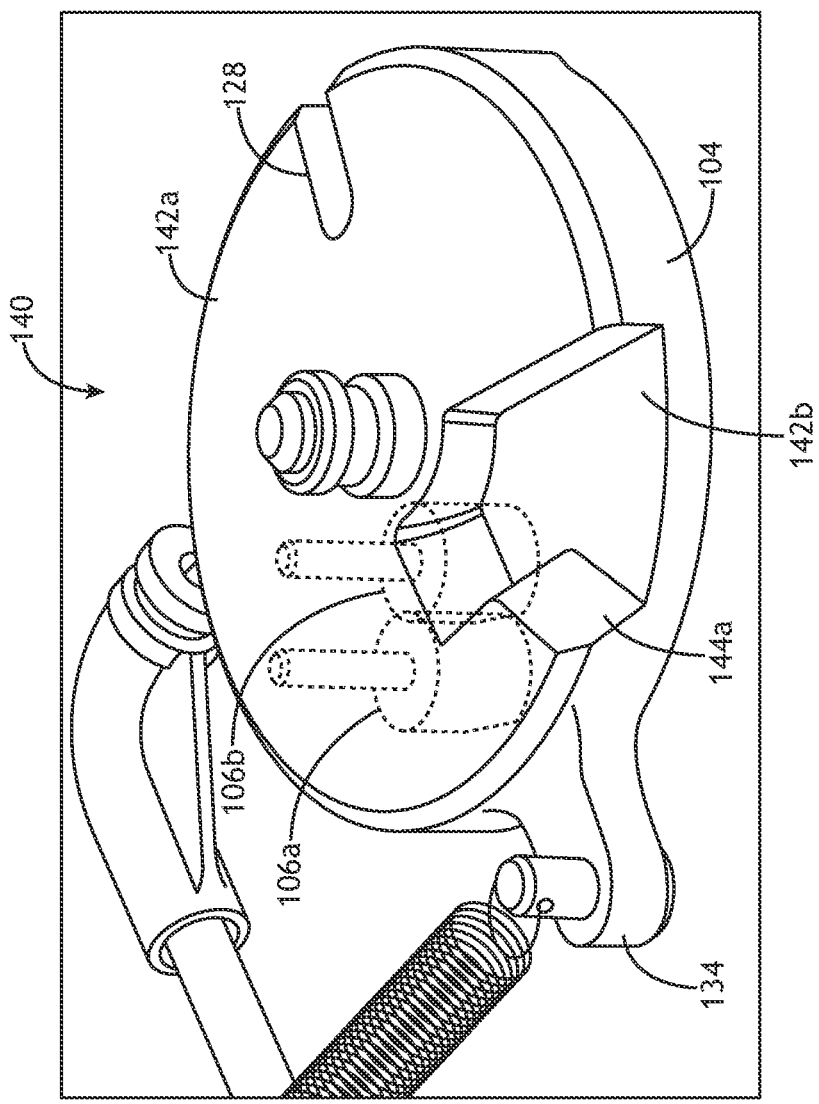
FIG. 1D depicts a partial perspective view of an assembly with a rotary actuator, a first pin in a depressed position, and a second pin in an undepressed position, in accordance with one or more embodiments of the present disclosure.
Figure 1E:
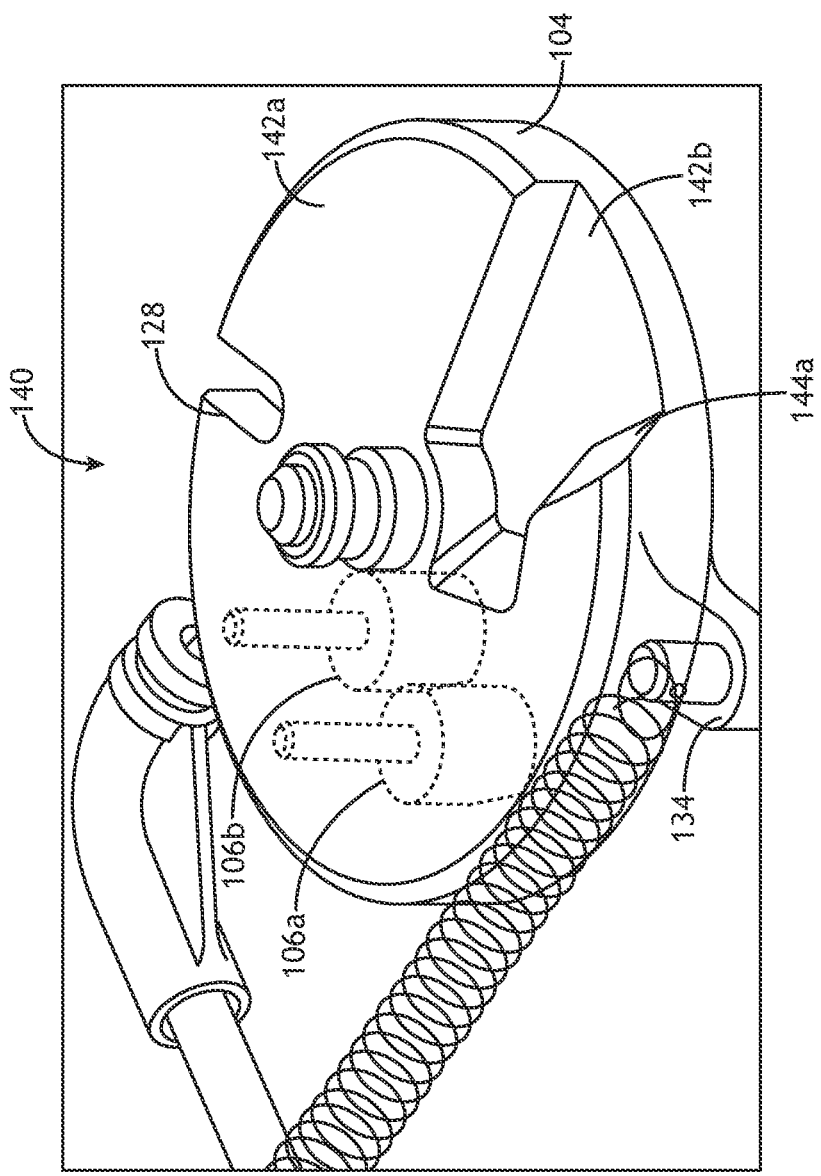
FIG. 1E depicts a partial perspective view of an assembly with a rotary actuator and a set of pins in a depressed position, in accordance with one or more embodiments of the present disclosure.
Figure 1F:
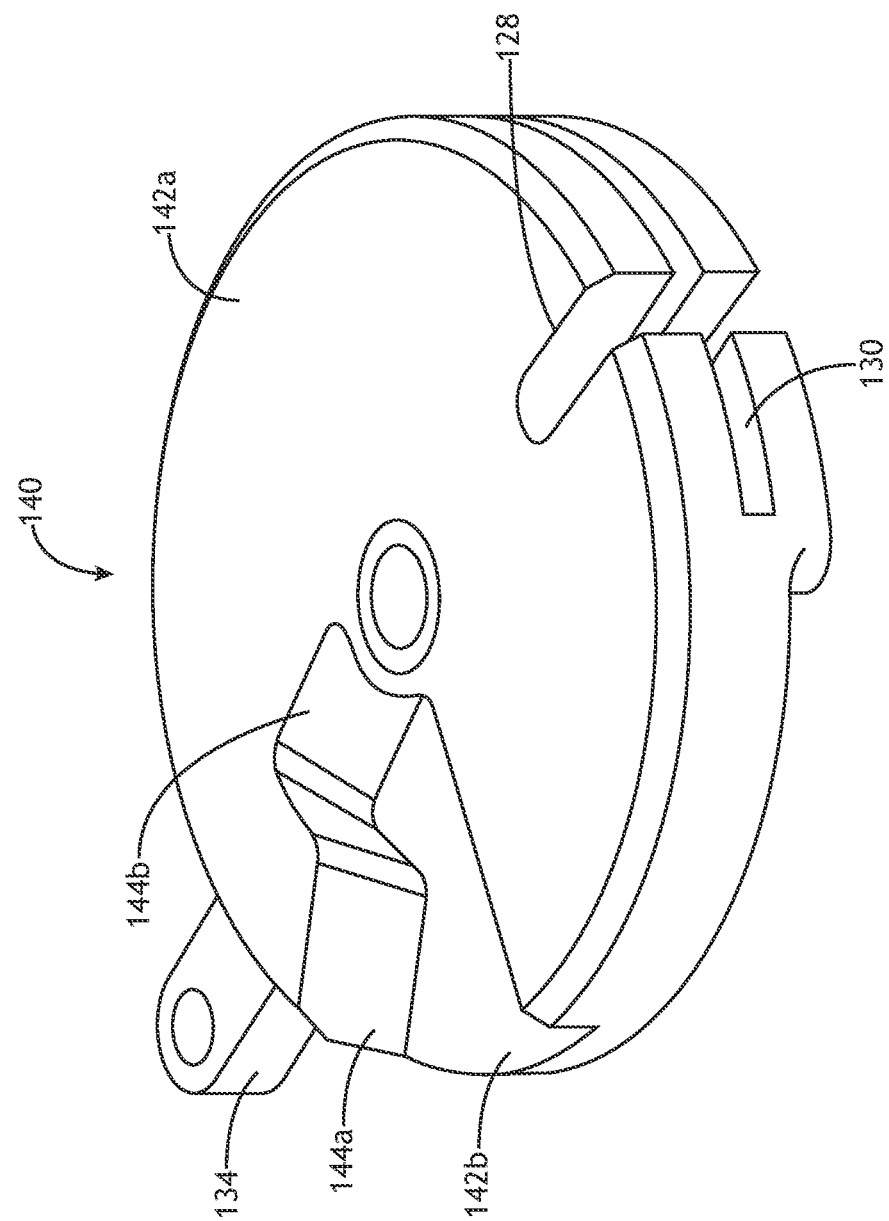
FIG. 1F depicts a perspective view of a rotary actuator including a cam profile with one or more surfaces connected by one or more ramps, in accordance with one or more embodiments of the present disclosure.
Figure 1G:
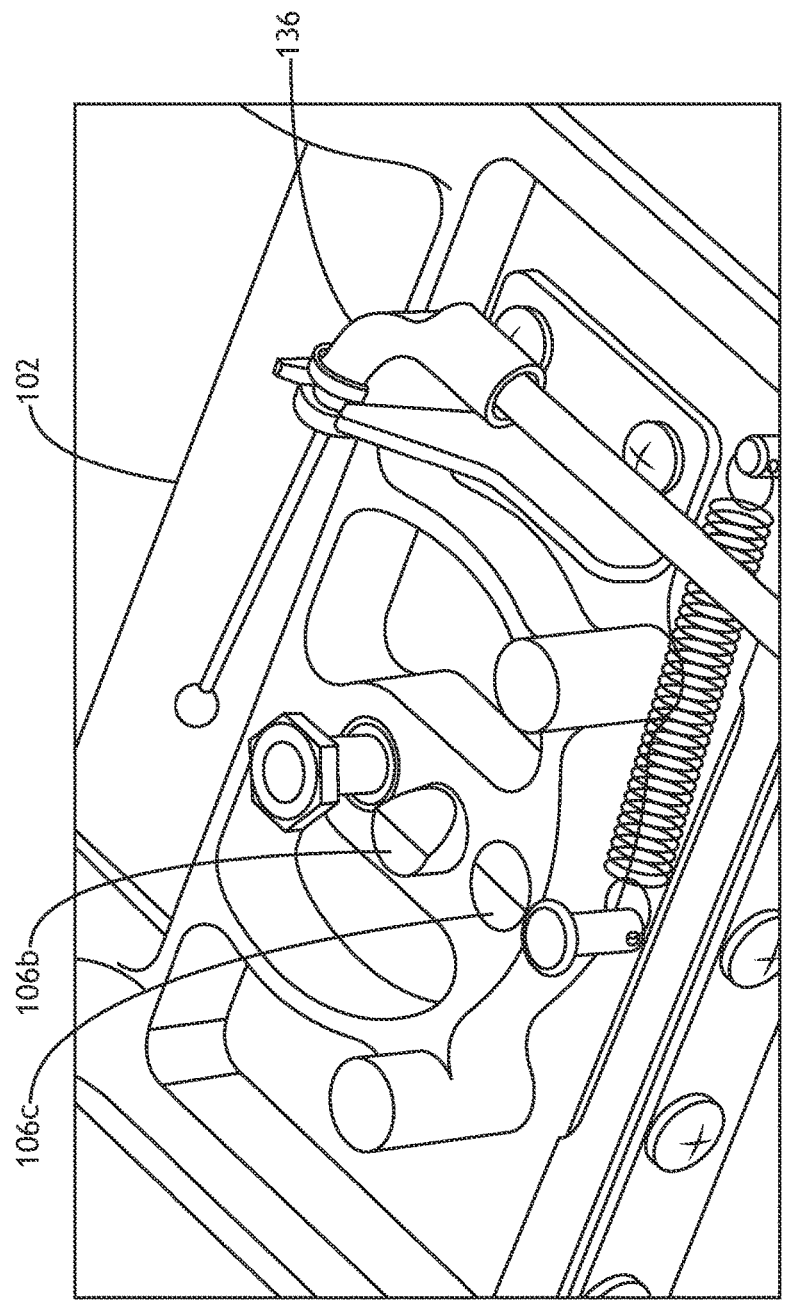
FIG. 1G depicts a perspective view of an assembly with a rotary actuator hidden to illustrate a cable fitting and locations for a set of pins within a carriage, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

U.S. Pat. No. 8,550,224, titled "Energy Absorption System", naming Roland Bauer as inventor, filed on Apr. 8, 2009, is incorporated herein by reference in the entirety.

Reference will now be made in detail to the subject matter disclosed, which is illustrated in the accompanying drawings. Embodiments of the present disclosure are generally directed to energy attenuation system. The energy attenuation system may include an assembly which translates one or more pins within an energy attenuation sheet. The assembly may include a rotary actuator rotatably coupled to a carriage. The rotary actuator may include a cam profile for translating the pins in and out of a bore in a carriage as the rotary actuator is rotated about the carriage. The cam profile may include two ramps on separate orbital positions about the center point of the actuator. The ramps may be staggered from each other to provide a serial ejection, translation, or depression of the pins (one after another), necessary for the design intent for this mechanism. The pins may retract when the actuator is rotated in the opposite direction due to a spring loading. Advantageously, the assembly may include a relatively compact profile in which the rotary actuator translates the pins. Additionally, the rotary actuator may be cable driven by a cable which is oriented and positioned in such a way that further improves the ability of the assembly to fit in compact spaces. The assembly may thus be used in energy attenuation systems which are suitable for use in current and next generation seating, such as in various helicopter platforms. The assembly may also be beneficial in other platforms besides the system.

Referring now to FIGS. 1A-1G, an assembly 100 is described, in accordance with one or more embodiments of the present disclosure. The assembly 100 may include one or more components, such as, but not limited to, a carriage 102, rotary actuator 104, pin(s) 106, compression spring(s) 108, cable 110, and/or extension spring 112. The rotary actuator 104 may also be referred to as a rotary member. The assembly 100 with the rotary actuator 104 may be beneficial to achieve a cable driven assembly which is configured to translate the pins 106 in a relatively compact longitudinal space, such as, but not limited to, a seat of a helicopter. An energy attenuation system for the seat of the helicopter may use the translation of the pins to adjust an attenuation, as will be described further herein.

In embodiments, the assembly 100 includes the carriage 102. The carriage 102 may include one or more rollers 114. The rollers 114 may be configured to move in one or more channels by which the carriage may stroke downwards. For example, the rollers 114 may constrain the movement of the carriage 102 within one or more c-channels. In embodiments, one or more of the rotary actuator 104, pin(s) 106, compression spring(s) 108, cable 110, and/or extension spring 112 may translate with the carriage 102. For example, one or more of the rotary actuator 104, the pin(s) 106, the compression spring(s) 108, the cable 110, and/or extension spring 112 may be coupled directly or indirectly to the carriage 102 such that translation of the carriage may be experienced by the various components.

In embodiments, the carriage 102 may define one or more holes 116. The one or more holes 116 may be defined by a wall 118 of the carriage 102, although this is not intended to be limiting. The holes 116 may also be referred to as through hole or bores. The walls of the carriage 102 may define any number of the holes 116. For example, the carriage 102 may define a hole 116a, a hole 116b, and/or a hole 116c. In embodiments, one of the holes 116 (e.g., hole 116a) may rotatably couple the rotary actuator 104 to the carriage 102. In embodiments, one or more of the holes 116 may receive the pins 106. For example, at least a portion of the pin 106a may be disposed in the hole 116b. By way of another example, at least a portion of the pin 106b may be disposed in the hole 116c.

In embodiments, the rotary actuator 104 may be rotatably coupled to the carriage 102. The rotary actuator 104 may rotate relative to the carriage 102 through a range of angles by the rotatable coupling. The assembly 100 may include any suitable rotatable coupling. For example, the rotary actuator 104 may be rotatably coupled to the carriage 102 by way of the hole 116a. The rotary actuator 104 may then rotate about a central axis of the hole 116a. In embodiments, the rotary actuator 104 may define a hole 120. The hole 120 may be aligned with the hole 116a for rotatably coupling the rotary actuator 104 to the hole 116a of the carriage 102 about the central axis. In embodiments, the hole 120 may be located in a center (e.g., concentric) of the rotary actuator 104, such that the hole 120 may be referred to as a concentric hole. The concentric hole may be advantageous to prevent eccentric movement of the rotary actuator 104. Eccentric movement may refer to an eccentric cam type motion or runout along the outer diameter of the rotary actuator 104. It is further contemplated the hole 120 may be nonconcentric, such that the hole 120 may be referred to as a nonconcentric hole. However, the concentric hole may be advantageous to achieve a relatively compact rotational motion of the rotary actuator 104. In this regard, the eccentric movement may cause the tab of the rotary actuator 104 to have a greater range of motion. The greater range of motion may be undesirable to achieving a compact seat design.

In embodiments, the assembly 100 includes a bearing 122 and/or a fastener 124 rotatably coupling the rotary actuator 104 with the carriage 102. For example, the bearing 122 and/or the fastener 124 may be inserted within the hole 116a and/or the hole 120 for rotatably coupling the rotary actuator 104 with the carriage 102. The bearing 122 and/or the fastener 124 couple the rotary actuator 104 to the carriage 102 while also allowing the rotary actuator 104 to rotate relative to the carriage 102. The bearing 122 may reduce friction between the carriage 102 and the rotary actuator 104 due to the relative rotational movement. The bearing 122 may include any suitable type of bearing, such as, but not limited to, a bushing, a ball bearing, and the like. The fastener 124 may be used to fasten the rotary actuator 104 to the carriage 102, thereby preventing the rotary actuator 104 from becoming inadvertently uncoupled during rotation. The fastener 124 may include any suitable type of fastener for fastening the rotary actuator 104 to the carriage 102, such as, but not limited to, a bolt or a rivet. Where the fastener 124 is a bolt, the bolt may be secured to the carriage 102 by a threaded insert. As depicted, the fastener 124 may be inserted within a central axis of the bearing 122. The bearing 122 may also include a flange. The flange may separate the fastener 124 from the rotary actuator 104. For example, the flange may separate the fastener 124 from the rotary actuator 104 to prevent the fastener 124 from clamping down onto the rotary actuator 122. The bearing 122 may thus reduce friction between the rotary actuator 104 and the fastener 124 as the rotation actuator 104 is rotated relative to the fastener 124. It is further contemplated that the assembly 100 may include any suitable methods for rotatably coupling the rotary actuator 104 with the carriage 102.

In embodiments, the assembly 100 may include the cable 110. The cable 110 may be coupled to the rotary actuator 104. The coupling between the cable 110 and the rotary actuator 104 may cause translation of the cable 110 to rotate the rotary actuator 104. For example, the rotary actuator 104 may be rotated between the first angular position, the second angular position, and/or the third angular position by the cable 110. The rotary actuator 104 may thus be considered a cable-driven rotary actuator.

The cable 110 may be coupled to the rotary actuator 104 in any suitable manner. For example, the cable 110 may be coupled to the rotary actuator 104 by a quick-disconnect, although this is not intended to be limiting. In embodiments, the cable 110 includes a fitting 126. The fitting 126 may couple the cable 110 to the rotary actuator 104. The fitting 126 may be disposed at an end of the cable 110. The fitting 126 may include, but is not limited to, a ball fitting. The ball fitting may be swaged or crimped onto the cable, although this is not intended to be limiting. In embodiments, the rotary actuator 104 defines a slot 128. The slot 128 may extend inwards from an outer radius of the rotary actuator 104. The slot 128 may be configured to receive the fitting 126 of the cable 110. The slot 128 may include a width which is larger than the fitting 126 by which the fitting 126 may be received within the slot 128 for coupling the cable 110 to the rotary actuator 104. In embodiments, the rotary actuator 104 may define a radial groove 130. The radial groove 130 may be formed along a portion of a radius of the rotary actuator 104. The radial groove 130 may extend inwards towards the axis of the rotary actuator. The radial groove 130 may include a width which is larger than the diameter of the cable 110. The dimensions may allow the cable 110 to translate through the radial groove 130, such that the radial groove 130 may also be referred to as a cableway. The fitting 126 may include a diameter which is larger than a width of the radial groove 130. The fitting 126 may be prevented from pulling through the radial groove 130 by the larger diameter. For example, when tension is applied to the cable 110, the cable 110 will pass through the radial groove 130 and the fitting 126 will abut against a surface of the slot 128. The fitting 126 may thus be used to couple the cable 110 to the rotary actuator 104 when tension is applied to the cable 110. The cable 110 may remain coupled to the rotary actuator until the tension is released from the cable and the fitting is removed from the slot 128. Advantageously, the cable 110 may be uncoupled from the rotary actuator 104 by removing the fitting 126 from the slot 128. This uncoupling may be non-destructive. In this regard, the fitting 126 may be reinstalled within the slot 128. The non-destructive coupling may allow for ease in servicing the assembly. The fitting 126 together with the slot 128 and the radial groove 130 may also be referred to as a quick disconnect coupling between the rotary actuator 104 and the carriage 102.

In embodiments, the assembly 100 may include a cable housing 136. The cable 110 may be housed in the cable housing 136. The cable housing 136 may include a relatively low coefficient of friction with the cable 110. Advantageously, the cable 110 may be unlikely to bind within the cable housing 136 due to the relatively low coefficient of friction, such that the cable housing 136 may act as a cableway. The cable housing 136 may include various fittings and/or conduit for routing the cable 110 to a desired destination (e.g., a control lever). For example, the cable housing 136 may include a 90-degree direction fitting. The directional fitting may change a direction of the cable while maintain a minimum bend radius. The directional fitting may also be coupled to a conduit.

In embodiments, the assembly 100 may include a mounting bracket 138. The mounting bracket 138 may mount the cable housing 136 to the carriage 102. The cable housing 136 may remain fixed to the carriage 102 while the cable 110 translates due to the mounting bracket 138. For example, the mounting bracket 138 may be coupled to the carriage 102 by one or more fasteners. The term fastener may generally refer to any fastener known in the art, such as, but not limited to, a pin, a rivet, or a bolt. By way of another example, the mounting bracket 138 may be coupled to a directional fitting of the cable housing 136.

In embodiments, the carriage 102 may include one or more stops 132. The stops 132 may also be referred to as stop limits. The rotary actuator 104 may be stopped at one or more angles by the stops 132. For example, the rotary actuator 104 may be stopped at an angular position by the stops 132a and at an additional angular position by the stops 132b. The angular motion of the rotary actuator 104 may then be constrained between the stops 132a and the stops 132b. The rotary actuator 104 may then rotate within a range defined by the stops 132. A stroke of the cable 110 may be based on the position of the stops 132. Stroke may refer to an amount of movement (e.g., rotational movement or linear movement).

The rotary actuator 104 may include one or more features for interfacing with the stops 132. In embodiments, the rotary actuator 104 may include a tab 134. The tab 134 may extend from an outer diameter of the rotary actuator 104. The tab 134 may interface with the stops 132 and prevent rotation of the rotary actuator 104. The tab 134 may then prevent the rotary actuator 104 from being rotated beyond the stops 132 by the cable 110. In this regard, the tab 134 may be considered a stop tab.

In embodiments, the assembly 100 may include the extension spring 112. The term extension spring may refer to a spring which is stretched in extension. The extension spring 112 may exhibit an axial force attempting to resist the extension. The extension spring 112 may be coupled between the carriage 102 and the rotary actuator 104. The extension spring 112 may be extended when the rotary actuator 104 is at the rotational stops 132a when tension is applied to the cable 110. The extension of the extension spring 112 may impart a spring force on the rotary actuator 104, causing the rotary actuator 104 to return to the stops 132b as the tension is released from the cable 110. In this regard, the extension spring 112 may also be considered an actuator return or a return spring.

The extension spring 112 may be coupled between the rotary actuator 104 and the carriage 102 in any suitable manner. For example, a first end of the extension spring 112 may be coupled to the tab 134 of the rotary actuator 104. In this regard, the tab 134 of the rotary actuator 104 may be considered a spring mount point and a stop tab. By way of another example, a second end of the extension spring may be coupled to the carriage 102. The ends of the extension spring 112 may be coupled to the tab 134 and the carriage 102 in any suitable manner, such as, but not limited to, one or more fasteners. The tab 134 and the carriage 102 may define a hole for receiving the fasteners. The fasteners may then be inserted within the hole of the tab 134 and the carriage 102. In embodiments, the fasteners may include a clevis pin with a hole for receiving the ends of the spring. A looped terminal at the end of the spring may be inserted into the hole of the clevis pin. The extension spring 112 may then prevent the clevis pin from being backed out of the holes of the tab 134 and/or the carriage 102.

In embodiments, the assembly 100 may include the pins 106. The pins 106 may be translated (e.g., projected or depressed) linearly based on the rotation of rotary actuator 104. In embodiments, the rotary actuator 104 may include a cam profile 140. The cam profile 140 may be disposed on an end (e.g., as opposed to along a diameter of the rotary actuator 104) of the rotary actuator 104. The cam profile 140 may be adjacent to the carriage 102 when the rotary actuator 104 is rotatably coupled to the carriage 102. The cam profile 140 may then interface with the pins 106 when the pins 106 are disposed within the holes 116. The cam profile 140 may impart translational motion in the pins 106 from rotational movement of the rotary actuator 104. In this regard, the pins 106 may also be referred to as a follower. Similarly, the rotary actuator 104 together with the pins 106 may be considered a rotating cam-translating follower. The cam profile 140 may be referred to as an end-cam due to the pins 106 moving in an axis parallel to the axis of rotation of the rotary actuator 104.

A timing of stages for the translation of the pins 106 is now described. Stage may refer to when a pin is depressed by the rotary actuator 104. The timing of the stage may be adjusted by the design of the cam profile 140 and/or the pins 106. In embodiments, the rotary actuator 104 uses a three-stage effect for the pin 106a and the pin 106b. The three-stage effect may include a first stage in which neither the pin 106a or the pin 106b are depressed, a second stage in which one of the pin 106a or the pin 106b are depressed, and a third stage which both of the pin 106a or the pin 106b are depressed. The first stage may correspond to a first angular position of the rotary actuator 104. Similarly, the second stage may correspond to a second angular position of the rotary actuator 104. Similarly, the third stage may correspond to a third angular position of the rotary actuator 104. Thus, the rotation of the rotary actuator 104 may induce the three-stage effect for the pin 106a and the pin 106b. The three-stage effect may be advantageous in translating the pins 106 for use in an energy attenuation system.

In embodiments, the assembly 100 includes one or more compression springs 108. The term compression spring may refer to a spring which is compressed. The compression spring 108 may exhibit axial force attempting to resist compression. The compression spring 108 may be coupled between the carriage 102 and the pin 106. For example, the compression spring 108a may be coupled between the hole 116c of the carriage 102 and the pin 106a. By way of another example, the compression spring 108b may be coupled between the hole 116b of the carriage 102 and the pin 106b. The compression spring 108 may be compressed when the pin 106. The compression of the compression spring 108 may impart a spring force on the pin 106, causing the pins 106 to abut the pin against the cam profile 140. The compression springs 108 may include sufficient spring force to keep the pins 106 in contact with the cam profile 140. The springs may keep the pins in contact with a cam profile of the rotary actuator 104 when the rotary actuator 104 is in each of the first angular position, the second angular position, and the third angular position. Advantageously, the compression spring 108 may cause the pin 106 to translate from the depressed position to the undepressed position. In this regard, the compression spring 108 may also be considered a pin return or a return spring. For example, the compression spring 108b may translate the pin 106b to the undepressed position as the rotary actuator 104 rotates from the third angular position to the second angular position. By way of another example, the compression spring 108a may translate the pin 106a to the undepressed position as the rotary actuator 104 rotates from the second angular position to the first angular position.

The rotary actuator 104 together with the compression springs 108 may provide a relatively reliable method for depressing the pins 106. In this regard, the cam profile 140 will automatically depress the pins. Additionally, the pins 106 will be unable to be undepressed or backed out by the cam profile 140, until the rotary actuator 104 is rotated backwards. Keeping the pins depressed may be advantageous given that the assembly may experience a variety of forces (e.g., during flight and/or in an impact event). Finally, the pins 106 may remain abutted to the cam profile 140, thereby causing the pins to automatically become undepressed as the rotary actuator is rotated backwards.

The cam profile 140 may include any suitable cam profile for linearly translating the pins 106 as the rotary actuator 104 is rotated. In embodiments, the cam profile 140 may include, but is not limited to, one or more surfaces 142 and/or one or more ramps 144.

In embodiments, the cam profile 140 includes one or more surfaces 142. The surfaces 142 may be substantially parallel to one another. The axis of rotation may also be aligned perpendicular to the surfaces 142. The surfaces 142 may also be referred to as a face of the rotary actuator 104. For example, the cam profile 140 may include a surface 142a and a surface 142b. The surface 142a may be offset from the surface 142b (e.g., by offset by a distance). In this regard, the surface 142a may be closer to the carriage 102 than the surface 142b. The distance of the offset between the surface 142a and the surface 142b may correspond to the amount of distance in which the pins 106 are translated or depressed. The pins 106 may be considered to be in a depressed position when interfacing with the surface 142a and in a nondepressed position when interfacing with the surface 142b.

In embodiments, the cam profile 140 include one or more ramps 144. The ramps 144 may connect the surface 142a and the surface 142b. The ramps 144 may promote a translational movement in one or more pins 106 between the depressed position and the undepressed position. The ramps 144 may be used to provide a mechanical advantage when translating (e.g., raising and/or lowering) the pins by rotational motion of the rotary actuator 104. The ramps 144 may also be referred to as an inclined plane. The ramps 144 may include a slope. The slope may be selected to balance a mechanical advantage provided by the ramp against a space requirement. The ramps 144 may include a wide range of slopes, such as, but not limited to, a slope of between thirty and sixty degrees. For example, the ramp may include a slope of forty-five degrees, although this is not intended to be limiting.

The cam profile 140 may include any number of the ramps 144. The number of the ramps 144 may be selected based on the number of the stages and similarly the number of the pins 106. For example, the cam profile 140 may include a ramp 144a and a ramp 144b. The ramp 144a of the rotary actuator 104 may interface with the pin 106a. The interface may cause the pin 106a to be translated inwards or depressed when the rotary actuator 104 is rotated from the first angular position to the second angular position. Similarly, the interface may cause the pin 106a to be translated outwards or undepressed when the rotary actuator 104 is rotated from the second angular position to the first angular position. The ramp 144b of the rotary actuator 104 may interface with the pin 106b. The interface may cause the pin 106b to be translated inwards or depressed when the rotary actuator 104 is rotated from the second angular position to the third angular position. Similarly, the interface may cause the pin 106b to be translated outwards or undepressed when the rotary actuator 104 is rotated from the third angular position to the second angular position. In embodiments, the ramp 144a may be angularly offset from the ramp 144b at a separate angular position on the rotary actuator 104. For example, the pins 106 may be translated by the cam profile at different angular position of the rotary actuator 104 due to the angular offset between the ramp 144a and the ramp 144b. When the rotary actuator 104 is rotated a first amount, the ramp 144a contacts the pin 106a and promotes a linear translation of the pin 106a. When the rotary actuator 104 is rotated a second amount, the ramp 144b contacts the pin 106b and promotes a linear translation of the pin 106b.

One or more features for interfacing the ramp 144 of the rotary actuator 104 with the pins 106 are now described. In embodiments, the pins 106 may include a ramp 146. The ramp 146 of the pins 106 together with the ramp 144 of the rotary actuator 104 may serve as an inclined plane for raising and lowering the pins 106. For example, the pin 106a may include a ramp 146a. By way of another example, the pin 106b may include a ramp 146b. The various ramps may or may not include the same slope. In embodiments, the ramp 146a of the pin 106a may be matched with the ramp 144a of the rotary actuator 104. In embodiments, the ramp 146b of the pin 106b may be matched with the ramp 144b of the rotary actuator 104. The ramps 146 of the pins 106 may be matched to the ramps 144 of the rotary actuator 104 by including the same slope. The pins 106 may then be translated by the interface between the ramps 144 of the rotary actuator 104 and the ramps 146 of the pins 106.

Although the pins 106 are described as including the ramps 146, this is not intended as a limitation of the present disclosure. It is further contemplated that the pins 106 may not include the ramps 146. For example, the pins 106 may include a spherical ball or roller. The spherical ball or roller may interface with the ramps 144 of the rotary actuator 104. However, the use of the ramps 146 may include a greater surface area in contact with the ramp 144 as compared to the spherical ball or roller. Therefore, the use of the ramps 146 may be advantageous in reducing one or more of a point contact, pressure, and/or stress as compared to the spherical ball or roller due to the greater surface area. Reducing the point contact, pressure, and/or stress may allow the pins 106 and/or the rotary actuator 104 to undergo less plastic deformation or wear.

Although the pins 106 are described as being in the undepressed stage when the rotary actuator is in the first angular position corresponding to when the cable under the least amount of tension, this is not intended as a limitation of the present disclosure. The pins 106 may normally be depressed. The pins 106 may then be undepressed when the rotary actuator 104 is rotated from the first angular position to the second and third angular positions. Such arrangement may be achieved by various modifications to the assembly. For example, such arrangement may be achieved by adjusting the position of the surface 142a and the surface 142b. By way of another example, such arrangement may be achieved by adjusting the position in which the extension spring 112 is coupled to the carriage 102 together with the position of the mounting bracket 138.

In embodiments, the pins 106 may include a position relative to the center bore of the rotary actuator 104. For example, the pins 106 may be aligned relative to the center bore. The pins 106 may be aligned in series or in vertical line. As depicted, the pin 106a is aligned in series with pin 106b at what may be referred to as a 6 o'clock position. The terminology clock position is used to refer to a position of the pins 106 relative to a center bore of the rotary actuator 104. A topmost portion of the rotary actuator 104 may be considered a 12 o'clock position. The clock position may also be referred to as an orbit. As may be understood, the pins 106 may be at any clock position relative to center bore of the rotary actuator 104, such that the 6 o'clock position is not intended to be limiting. For example, the clock position or orbit of the pins 106 may be changed to adjust the timing at which the pins 106 are depressed. Furthermore, the description and depiction of the pins 106 being aligned is not intended as a limitation of the present disclosure. The pins 106 may be staggered from one another such that the pins are not aligned. The pins 106 may be staggered at any number of positions relative to the center bore. For example, the pin 106a may be at the 7 o'clock position and the pin 106b may be at the 6 o'clock position, although this is not depicted. The relative arrangement of the pins 106 may be selected to achieve a desired timing or stroke length of the cable 110 corresponding to when the pins 106 are depressed. The timing for the pins 106 may also be adjusted based on the orbit of the ramps 144 relative to the center bore of the rotary actuator.

Referring now to FIG. 2, a system 200 is described, in accordance with one or more embodiments of the present disclosure. The system 200 may also be referred to as an energy attenuation system. The system 200 may include one or more components, such as, but not limited to, the assembly 100, a lever 202, a deformable member 204, one or more sheets 206, and a seat member 208.

The seat member 208 may also be referred to as a frame member of an aircraft seat. The seat member 208 may provide structural support for the aircraft seat. In embodiments, the aircraft seat may include two or more of the seat members 208 (and similarly two or more of the assemblies 100), although this is not depicted. The seat member 208 may be fixed within the aircraft. In this regard, the seat member 208 may remain stationary during impact events. In embodiments, the carriage 102 of the assembly 100 is configured to stroke downwards or otherwise translate relative to the seat member 208. Commonly, the carriage 102 may translate linearly downwards relatively to the seat member 208 towards the floor of the aircraft in the impact event. For example, the rollers of the carriage 102 may translate in one or more c-channels (not depicted) of the aircraft seat, although this is not intended to be limiting. The rollers may constrain the movement of the carriage within the one or more c-channels. In embodiments, the carriage 102 may stroke downwards when a given downwards force is applied. For example, the carriage 102 may stroke downwards when 9 G is exceeded, although this is not intended to be limiting. The minimum force to stroke the carriage 102 may be based on the design of the system 200. The carriage 102 may include any amount of downwards stroke. For example, the carriage 102 may include a stroke of between 8 or 10 inches, although this is not intended to be limiting.

The lever 202 may also be referred to as a weight adjustment mechanism, a weight adjustment control lever, and the like. The lever 202 may be mounted on the periphery of a seat of an aircraft. When an occupant intends to sit in the seat, the pilot may set the angle of the lever 202 accordingly to the weight of the occupant. The angle of the lever 202 may thus correspond to one or more weight settings for the system 200. The lever 202 may include a push-button to lock the lever at the desired setting. In embodiments, the system 200 may include a lightweight setting, a mediumweight setting, and/or a heavyweight setting. If the occupant is a lightweight occupant, the occupant may set the lever 202 to a first angle (e.g., the lightweight setting). Similarly, if the occupant is a mediumweight occupant, the occupant may set the lever 202 to a second angle (e.g., the mediumweight setting). Similarly, if the occupant is a heavyweight occupant, the occupant may set the lever 202 to a third angle (e.g., the heavyweight setting).

The lever 202 may be coupled to the cable 110. For example, the cable 110 may be routed between the lever 202 and the rotary actuator 104. The rotation of the lever 202 may thus cause translation of the cable 110 and similarly the rotation of the rotary actuator 104. In embodiments, the cable 110 may be routed between the lever 202 and the rotary actuator 104 with a relatively wide bend radius. Allowing for the relatively wide bend radius may ensure the cable 110 does not fall below a minimum bend radius. The minimum bend radius may refer to a radius below which the cable may become bound in the cable housing 136. The cable 110 may also be routed to the lever 110 in a plane. For example, the plane may be a lateral plane of a seatback of the aircraft seat. The lateral plane may also be referred to as an upright plane. Routing the cable in the lateral plane may be advantageous for reducing a width of the seat assembly. The routing in the lateral plane may be achievable due to the coupling location between the rotary actuator 104 and the cable 110 (e.g., going from the side of the rotary actuator 104, as compared to going from a face of the rotary actuator 104 in which the routing in the lateral plane would not be achievable). Thus, the system 200 and the assembly 100 may be advantageous for achieve translation of the pins in a relatively compact space, and may fit within current and next generation helicopter seating configurations.

The angle of the lever 202 may cause the cable 110 to translate under tension. The translation of the cable 110 may then cause the rotary actuator to rotate and for the pins 106 to translate. The lightweight setting of the lever 202 may correspond to the stage of the assembly 100 in which the pins 106 are not depressed. The mediumweight setting of the lever 202 may correspond to the stage of the assembly 100 in which one of the pins 106 are depressed. The heavyweight setting of the lever 202 may correspond to the stage of the assembly 100 in which both of the pins 106 are depressed. The lever 202 may include a stroke based on the angles for the settings. The stroke may correspond to the amount of translation provided to the cable 110. The stroke may include a range of values, such as, but not limited to between 15 and 60 degrees, although this is not intended to be limiting. For example, the stroke of the lever 202 between the lightweight setting and the heavyweight settings may be 20 degrees.

In embodiments, the system 200 may include the deformable member 204. The deformable member 204 may also be referred to as an energy attenuation device, an energy absorption device, and the like. The deformable member 204 may be coupled between the seat member 208 and the carriage 102 of the assembly 100. The deformable member 204 may be configured to deform under high impact loads. In particular, the deformable member 204 may deform to attenuate energy as the carriage 102 translates downwards relative to the seat member 208. The deformable member 204 may be formed of a sheet of material (e.g., sheet metal). The deformable member 204 may be bent into a shape and remain in the shape during normal flight condition and impact loads. For example, the deformable member 204 may include a section 210, a bent section 212, and a section 214. The section 210 may couple the deformable member 204 to the seat member 208. The bent section 212 may be between the section 210 and the section 214 of the deformable member 204. The section 214 of the deformable member 204 may be coupled to the carriage 102. The deformable member may be used in impact events with up to 47 G (e.g., g-force, gravitational force equivalent) of downforce, although this is not intended to be limiting. In embodiments, the system 200 may be used to attenuate the loads to reduce the lumbar loads to 1700 pounds or less, although this is not intended to be limiting.

The bent section 212 may also be referred to as a u-shaped bend. The bent section 212 may include a bend radius. The bend radius may define a stiffness of the bent section 212 and similarly an amount of energy attenuation when the deformable member 204 is deformed as the carriage 102 translated downwards relative to the seat member 208. In embodiments, the bend radius of the bent section 212 is decreased. Decreasing the bend radius may increasing the bending stress and similarly the attenuation of the system 200 (e.g., for heavier weight occupants). The smaller the bend radius, the more force required to bend. For example, the bend radius of the bent section 212 may be adjusted between three bend radii corresponding to the lightweight setting, the mediumweight setting, and the heavyweight setting of the lever 202.

In embodiments, the system 200 may include one or more of the sheets 206. The sheets 206 may be formed of a sheet of material (e.g., sheet metal). The sheets 206 may be hung from a cartridge (not depicted). The cartridge may be coupled to the seat member 208, such that the sheets 206 may normally remain fixed to the seat member 208 during an impact event. The sheets 206 may be hung from the cartridge by one or more fasteners (not depicted) which are designed to shear during the impact event. For example, the sheets 206 may be hung by one or more plastic screws, plastic rivets, and the like. The fasteners may be considered a sacrificial part which may be replaced after the impact event.

The sheets 206 may define one or more holes. The pins 106 may be translated through the holes of the sheets 206, causing the pins 106 to engage the sheets 206. For example, the pin 106a may engage the sheet 206a. By way of another example, the pin 106b may engage the sheet 206b. Thus, the lever 202 may cause the rotary actuator 104 to translate either zero, one, or two of the pins 106 into zero, one, or two of the sheets 206. The sheets 206 may be torn from the cartridge during the impact event due to the pins 106 engaging the sheets 206. The sheets 206 may then translate downwards with the carriage 102 and similarly the pins 106. When translated with the carriage 102, the sheets 206 may cause the bend radius of the bent section 212 to be decreased. Thus, the sheets 206 may increase the attenuation of the system 200. The sheets 206 may be used to adjust the attenuation the energy during the impact and reduce the lumbar loads for an operator based on the weight of the operator. For example, the bent section 212 may include a first bend radius with neither of the sheets 206, which may be considered a lightweight setting. The bent section 212 may include a second bend radius with the sheet 206a, which may be considered a mediumweight setting. The bent section 212 may include a third bend radius with both of the sheet 206a and the sheet 206b, which may be considered a heavyweight setting.

Figure 2A:
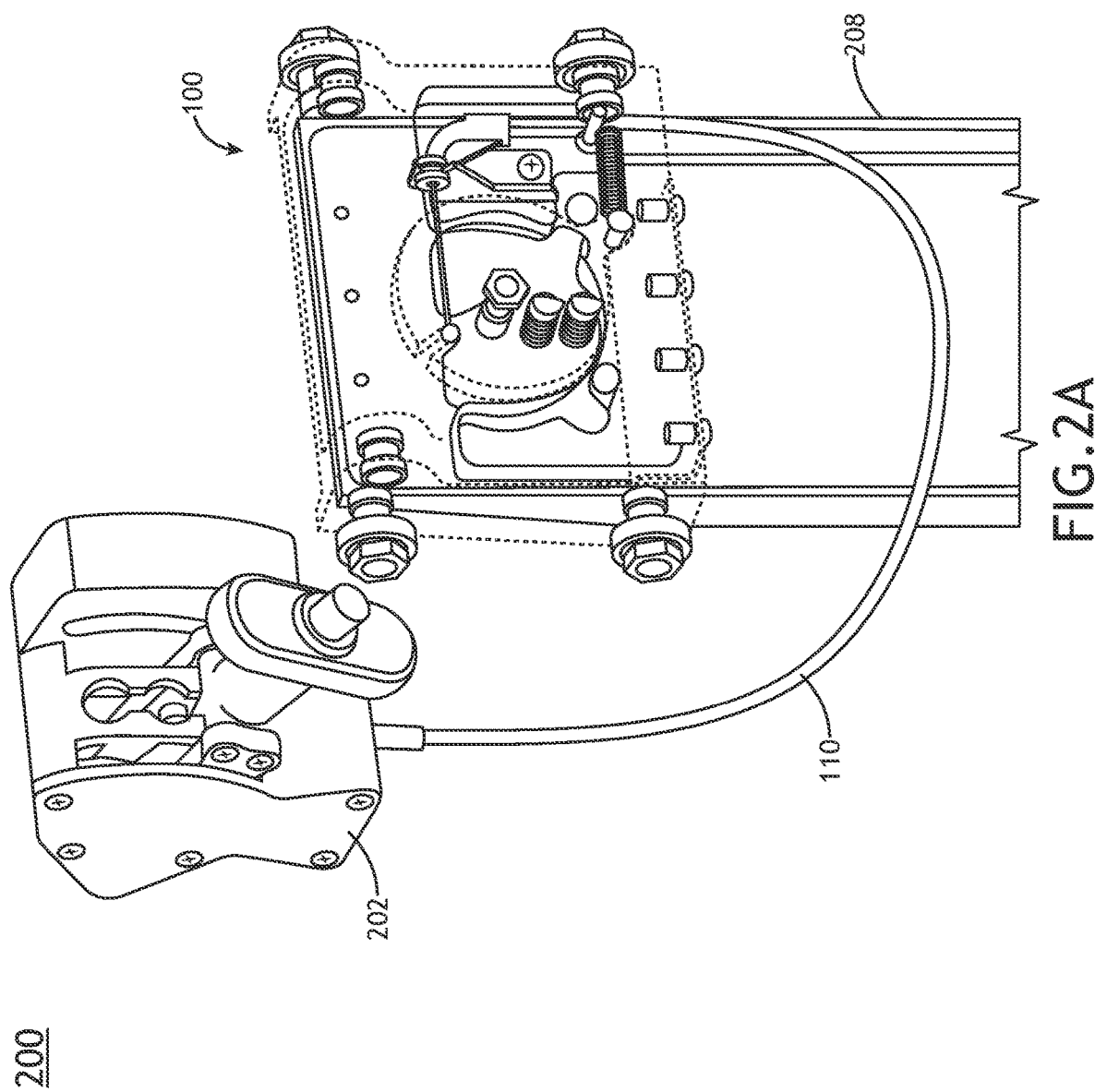
FIG. 2A depicts a perspective view of a system, in accordance with one or more embodiments of the present disclosure.
Figure 2B:
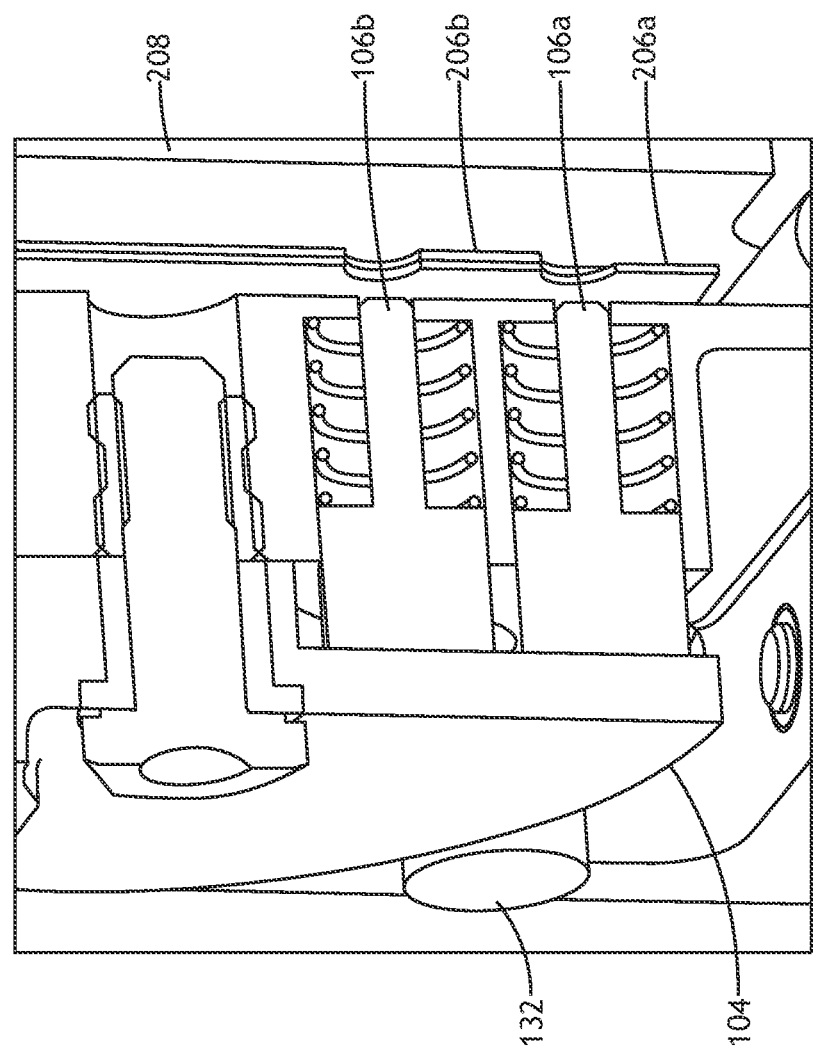
FIG. 2B depicts a partial view of a system with a rotary actuator and a set of pins in an undepressed position, in accordance with one or more embodiments of the present disclosure.
Figure 2D:
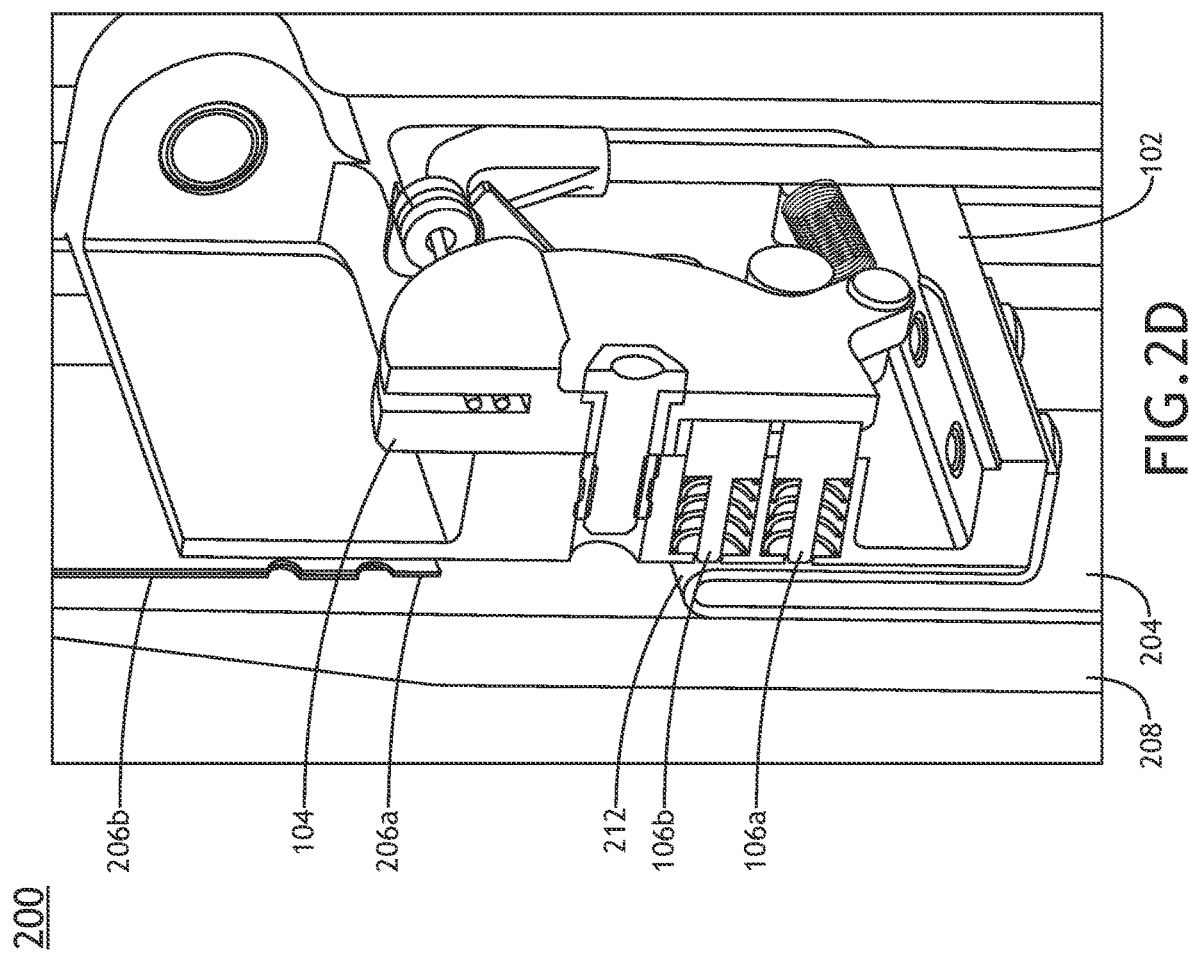
FIG. 2D depicts a partial view of a system with a deformable member during deformation, in accordance with one or more embodiments of the present disclosure.

Referring now in particular to FIGS. 2B-2D, a lightweight setting is described, in accordance with one or more embodiments of the present disclosure. When the lever 202 is at the lightweight setting, the cable 110 may be under a first amount of tension. The rotary actuator 104 may be in the first angular position due to the first amount of tension in the cable 110. In the first angular position, the pin 106a and the pin 106b may be undepressed such that the pins 106 do not engage the sheets 206. FIG. 2C may depict the position of the carriage 102 before the impact event. FIG. 2D may depict the position of the carriage 102 during the impact event while stroking downwards relative to the seat member 208. As depicted in FIG. 2D, the bent section 212 may deform to attenuation the energy and may include a first bend radius.

Figure 2E:
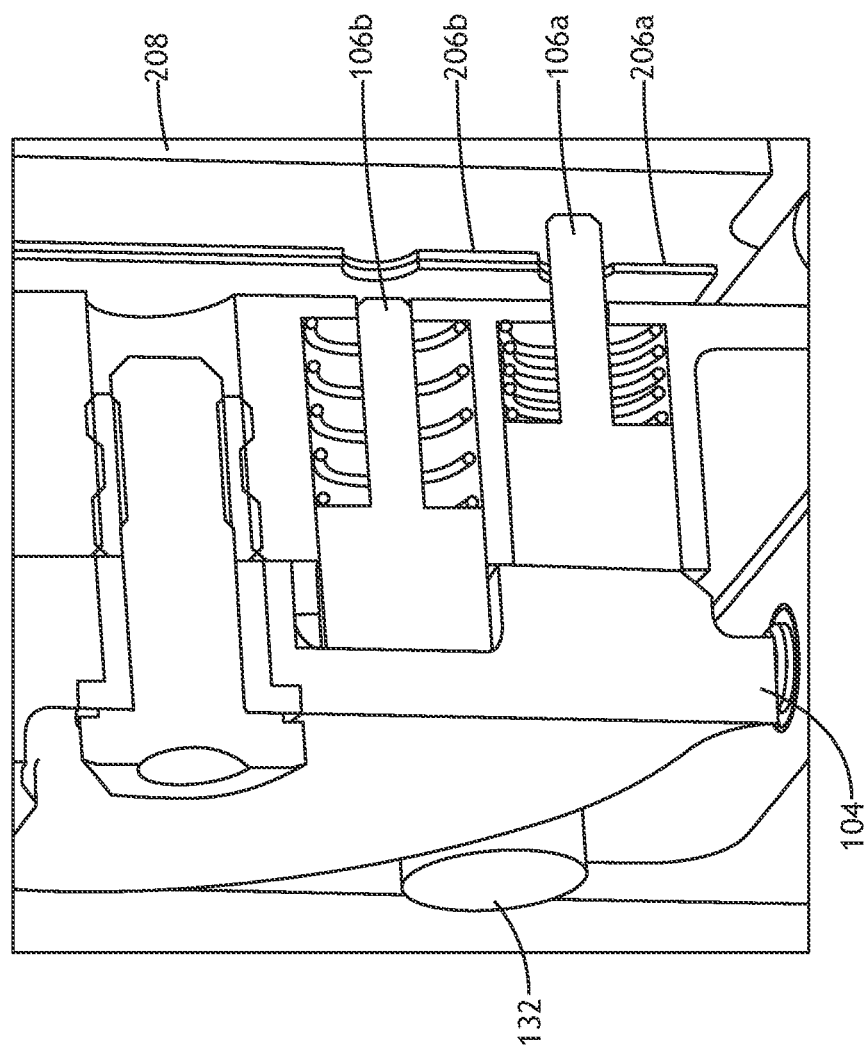
FIG. 2E depicts a partial view of a system with a rotary actuator, a first pin in a depressed position engaging a first sheet, and a second pin in an undepressed position, in accordance with one or more embodiments of the present disclosure.
Figure 2F:
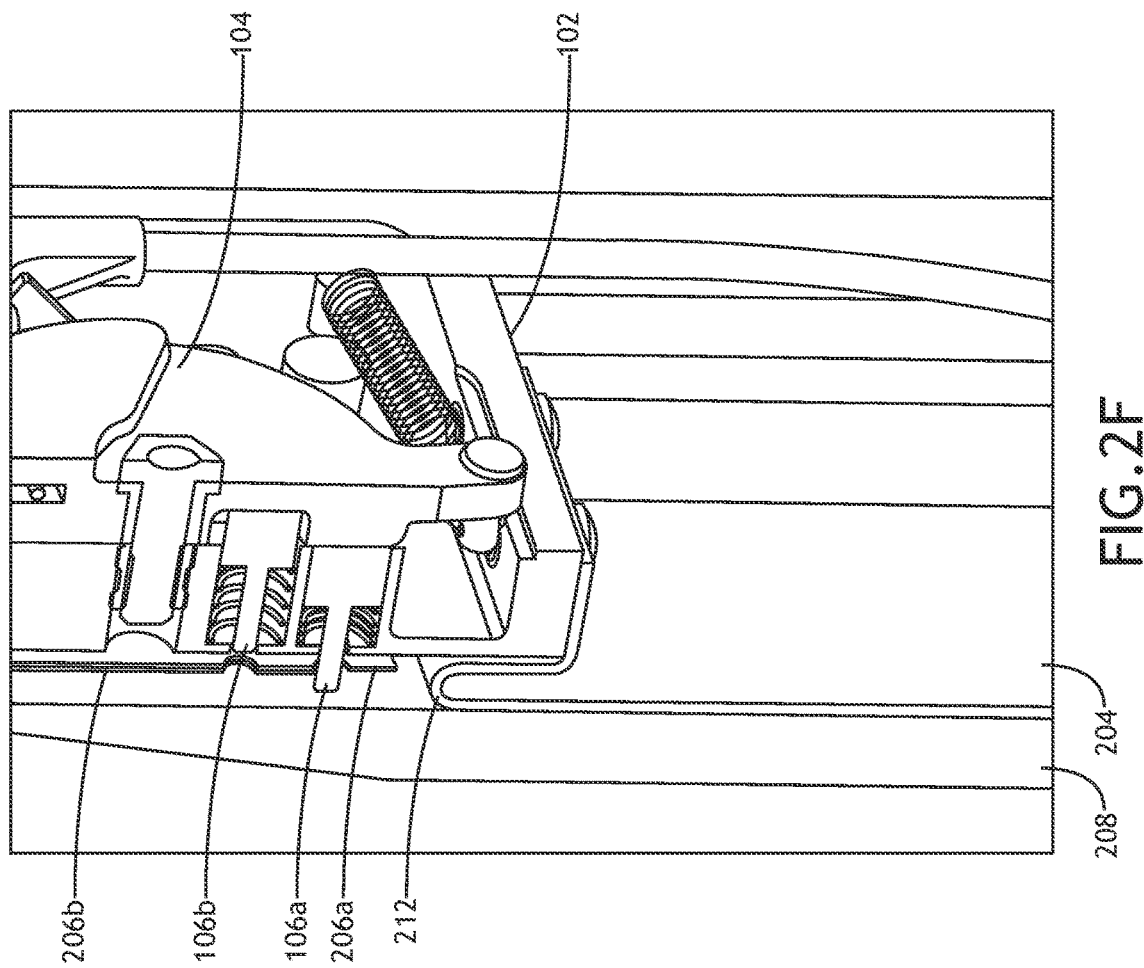
FIG. 2F depicts a partial view of a system with a deformable member prior to deformation with a first pin engaging a first sheet, in accordance with one or more embodiments of the present disclosure.
Figure 2G:
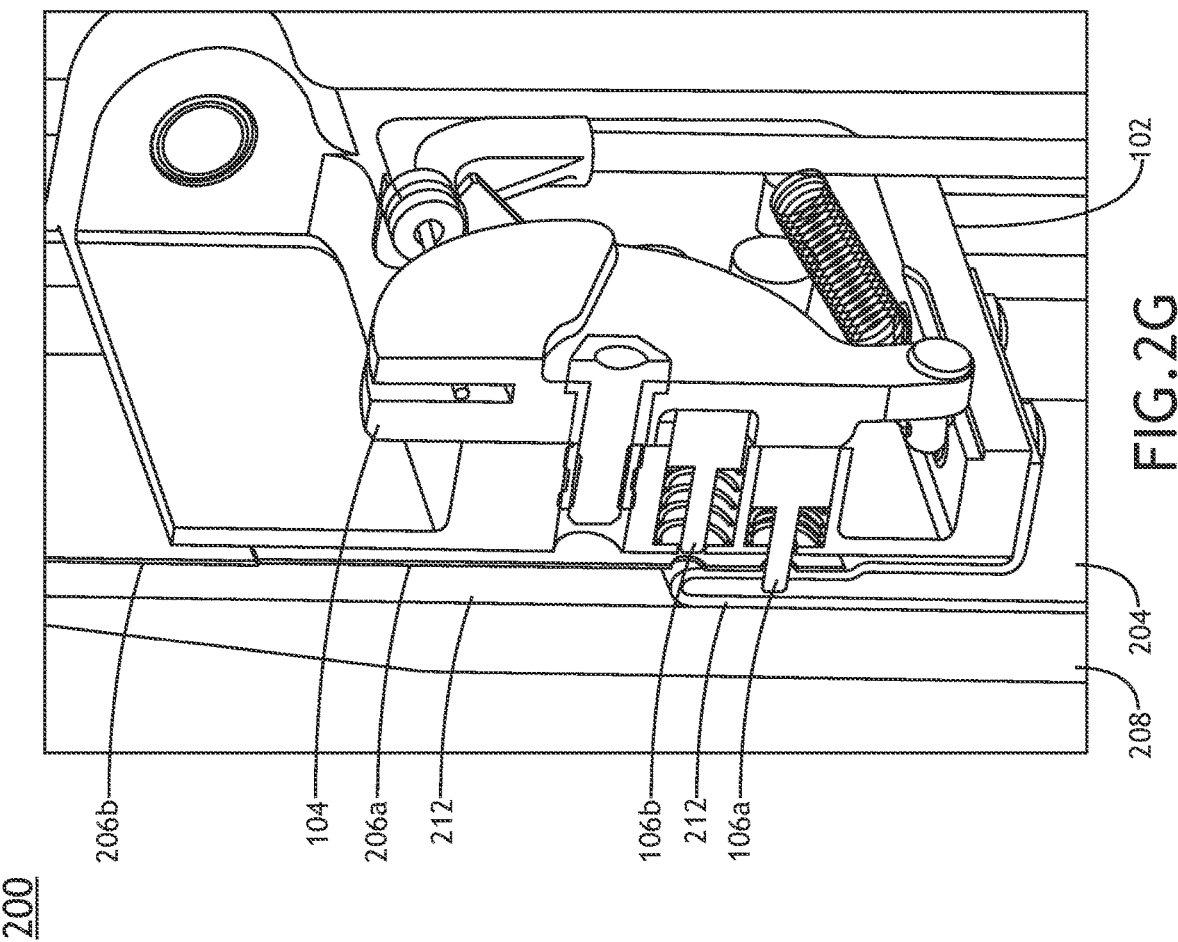
FIG. 2G depicts a partial view of a system with a deformable member during deformation with a first pin engaging a first sheet causing a bend radius of the deformable member to be decreased, in accordance with one or more embodiments of the present disclosure.

Referring now in particular to FIGS. 2E-2G, a mediumweight setting is described, in accordance with one or more embodiments of the present disclosure. When the lever 202 is at the mediumweight setting, the cable 110 may be under a second amount of tension. The rotary actuator 104 may be in the second angular position due to the second amount of tension in the cable 110. In the second angular position, the rotational motion of the rotary actuator 104 has produced a linear movement in the pin 106a to a depressed position. In the depressed position, the pin 106a is inserted within the sheet 206a. The pin 106a engages the sheet 206a when the rotary actuator 104 is in the second angular position. The pin 106b does not engage the sheet 206b when the rotary actuator 104 is in the second angular position. FIG. 2F may depict the position of the carriage 102 before the impact event. FIG. 2G may depict the position of the carriage 102 during the impact event while stroking downwards relative to the seat member 208. As depicted in FIG. 2G, the bent section 212 may deform to attenuation the energy and may include a second bend radius. The pin 106a engages the sheet 206a and causes the sheet to be dragged downwards with the carriage 102. The sheet 206 may then decrease the bend radius (as compared to the lightweight setting) of the deformable member 204 and adjust the attenuation characteristics of the system 200 for the midweight occupant.

Figure 2H:
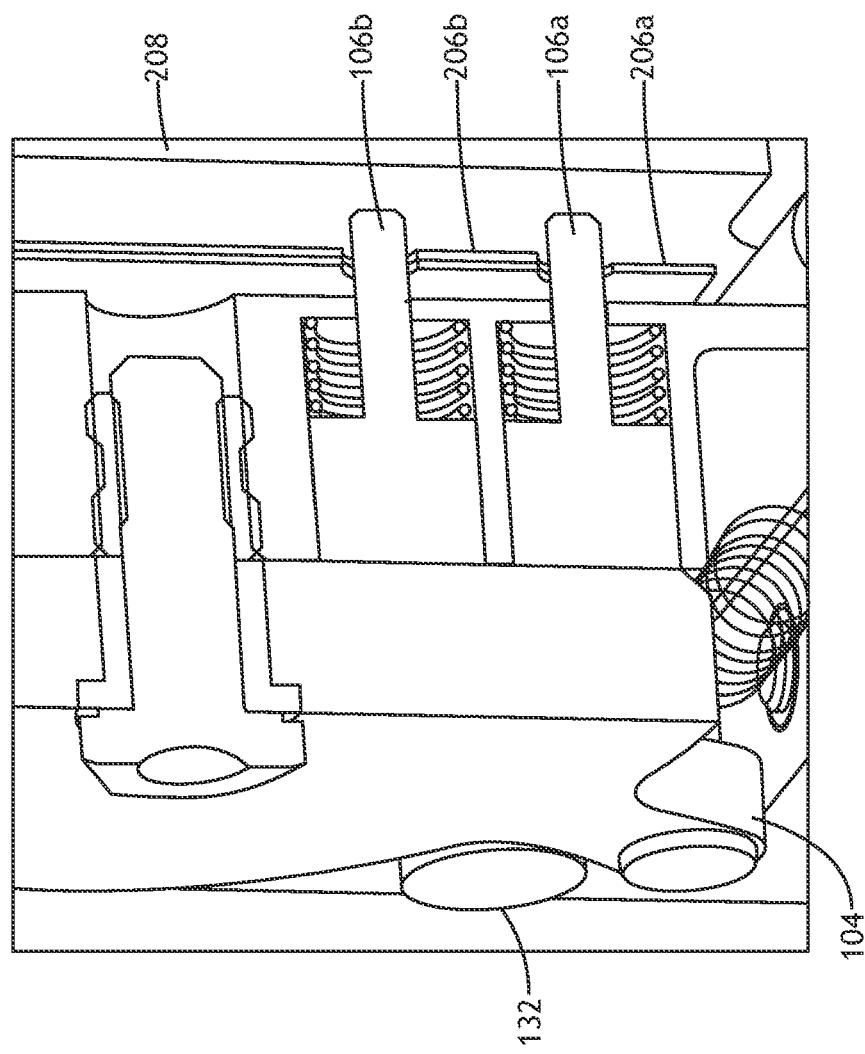
FIG. 2H depicts a partial view of a system with a rotary actuator, a first pin in a depressed position engaging a first sheet, and a second pin in a depressed position engaging a second sheet, in accordance with one or more embodiments of the present disclosure.
Figure 21:
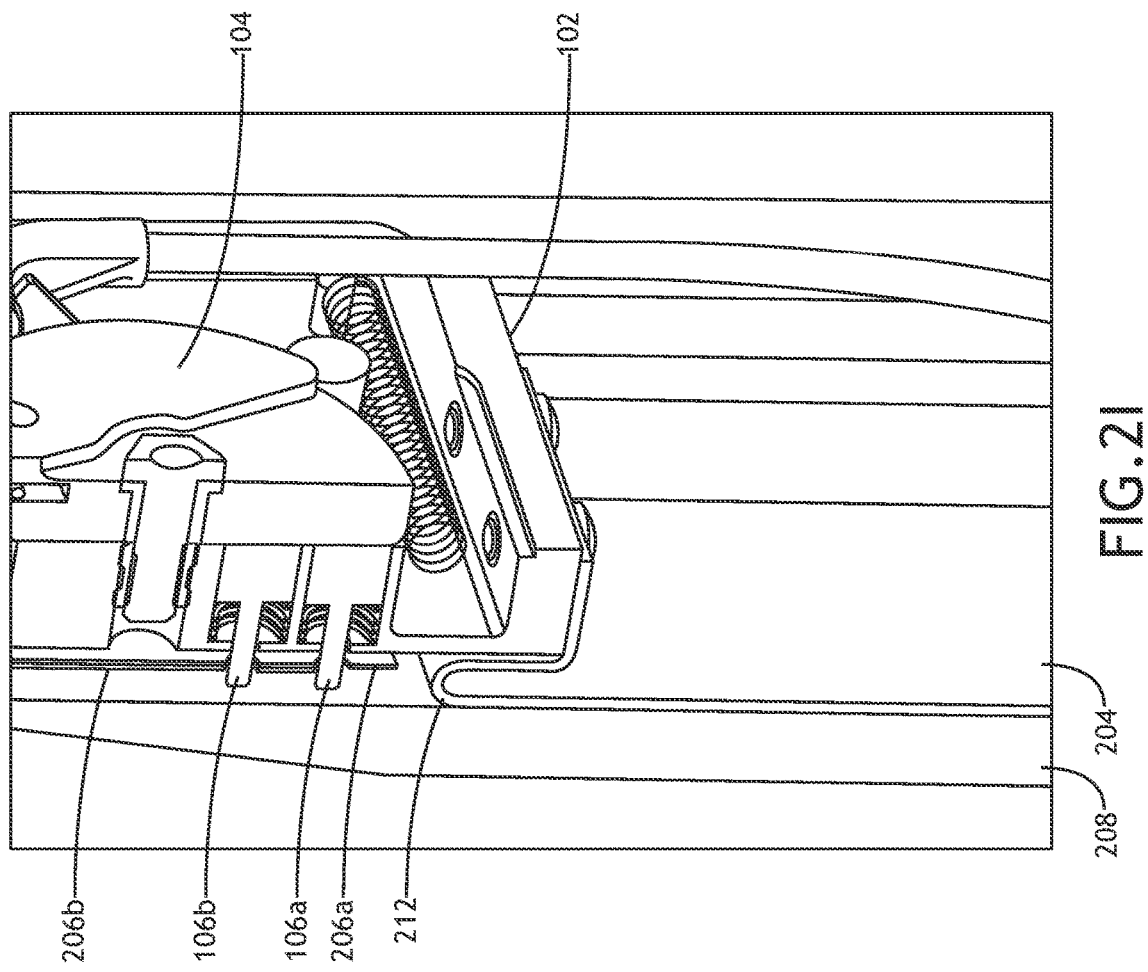
Figure 2J:
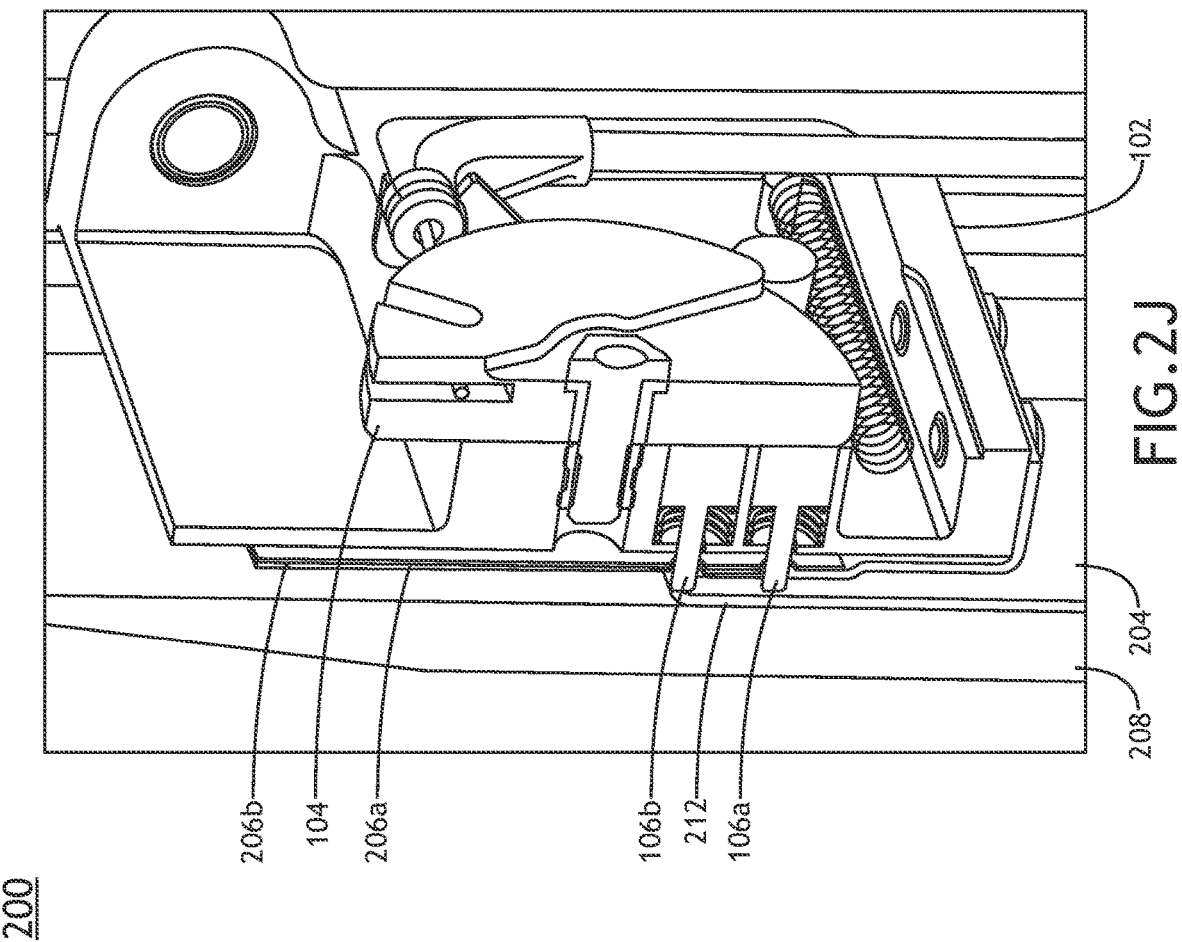
FIG. 2J depicts a partial view of a system with a deformable member during deformation with a first pin engaging a first sheet and a second pin engaging a second sheet causing a bend radius of the deformable member to be substantially decreased, in accordance with one or more embodiments of the present disclosure.

Referring now in particular to FIGS. 2H-2J, a heavyweight setting is described, in accordance with one or more embodiments of the present disclosure. When the lever 202 is at the heavyweight setting, the cable 110 may be under a third amount of tension. The rotary actuator 104 may be in the third angular position due to the third amount of tension in the cable 110. In the third angular position, the rotational motion of the rotary actuator 104 has produced a linear movement in both the pin 106a and the pin 106b to a depressed position. In the depressed position, the pin 106a is inserted within the sheet 206a and the pin 106b is inserted within the sheet 206b. Thus, the pin 106a engages the sheet 206a and the pin 106b engages the sheet 206b when the rotary actuator 104 is in the third angular position. FIG. 2I may depict the position of the carriage 102 before the impact event. FIG. 2J may depict the position of the carriage 102 during the impact event while stroking downwards relative to the seat member 208. As depicted in FIG. 2J, the bent section 212 may deform to attenuation the energy and may include a third bend radius. The pin 106a engages the sheet 206a and the pin 106b engages the sheet 206b causing the sheets to be dragged downwards with the carriage 102. The sheet 206a and the sheet 206b may then both decrease the bend radius (as compared to the mediumweight setting) of the deformable member 204 and adjust the attenuation characteristics of the system 200 for the heavyweight occupant.

Referring generally again to FIGS. 1A-2J, as may be understood, specific weights and/or percentiles for lightweight occupants, mediumweight occupants, and heavyweight occupants is not intended to be limiting. The specific setting may be based on a number of design considerations. Similarly, the specific settings may include a variety of ranges. For example, the lightweight occupant may correspond to less than a fifth percentile weight occupant and/or a weight of less than 80 kilograms, the mediumweight occupant may correspond to between the fifth and ninety-fifth percentile weight occupant or between 80 and 98 kilograms, and the heavyweight occupant may correspond to greater than the ninety-fifth percentile weight occupant or greater than 98 kilograms, although this is not intended to be limiting.

Although the system 200 is described as using a three-setting design to accommodate for lightweight occupants, mediumweight occupants, and heavyweight occupants, this is not intended as a limitation of the present disclosure. The system 200 may include any number of settings such as, two settings, three settings, four settings, or more.

The number of settings may be increased by an additional ramp 144 on the rotary actuator 104, an additional pin 106, and an additional sheet 206. The additional ramp 144 may interface with the additional pin 106, causing the additional pin 106 to be depressed and engage with the additional sheet 206. The additional ramp 144 may be staggered on another orbit from the ramp 144a or the ramp 144b to enable adequate stage timing. The pin 106a, the pin 106b, and the additional pin 106 may then be engaged in sequence to enable four weight settings. The four weight settings may include any suitable range. As depicted in the various figures, the pin 106a and the pin 106b may take up a substantial portion of the rotary actuator 104 such that there may not be room for the additional ramp 144 which is used to interface with the additional pin 106. As may be understood, the depiction of the rotary actuator 104 is not intended to be a limitation of the present disclosure. The dimensions of the rotary actuator 104 may be adjusted to accommodate the additional pin 106 and the additional ramp 144. For example, a diameter of the rotary actuator 104 may be increased to accommodate any number of additional pins and ramped surfaces.

Similarly, the system 200 may be designed to achieve more than four settings by increasing the number of pins, ramped surfaced, and sheets. The design of the assembly 100 thus offers a wide opportunity for expanding the number of weight settings. The ability to achieve four or more settings for the system 200 may be particularly advantageous for a number of reasons. It is contemplated that the ability to use the additional settings may be advantageous for fine tuning the settings of the energy attenuation to a given weight range. Fine tuning may also refer to decreasing a range for a given setting. Decreasing the weight range for the given setting may improve the impact characteristics near the edges for each setting.

Notably, the number of stages and weight settings may be limited by the amount of rotation allowed by the rotary actuator 106. In the example depicted, the rotary actuator 104 is rotated a given amount (e.g., between 30 or 35 degrees, although this is not intended to be limiting) from the first angular position to the third angular position. The assembly 100 may be modified to increase the amount of rotation by adjusting the position of the stops 132.

In embodiments, the pins 106 may be a same part number. Allowing the pins 106 to be the same part number may be advantageous for reducing an inventory requirement, a part count, and/or a cost of the assembly 100.

The terms first amount of tension, second amount of tension, and third amount of tension are not intended to be limiting as to the relative amounts of tension. In this regard, the first amount of tension may be less than or greater than the second amount of tension. Similarly, the third amount of tension may be less than or greater than the second amount of tension. Generally, the second amount of tension will be between the first amount of tension and the third amount of tension. For example, the first amount of tension may be less than the second amount of tension and the second amount of tension may be less than the third amount of tension for the various figures depicted. By way of another example, the first amount of tension may be greater than the second amount of tension and the second amount of tension may be greater than the third amount of tension for a modified design.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. An assembly comprising:
   a carriage defining a first hole and a second hole;
   a rotary actuator rotatably coupled to the carriage by which the rotary actuator is configured to rotate relative to the carriage between a first angular position, a second angular position, and a third angular position, wherein the rotary actuator includes a cam profile;
   a first pin, wherein at least a portion of the first pin is disposed in the first hole;
   a first compression spring coupled between the carriage and the first pin, wherein the first compression spring abuts the first pin against the cam profile;
   a second pin, wherein at least a portion of the second pin is disposed in the second hole;
   a second compression spring coupled between the carriage and the second pin, wherein the second compression spring abuts the second pin against the cam profile;
   a cable coupled to the rotary actuator, wherein the cable causes the rotary actuator to rotate between the first angular position, the second angular position, and the third angular position, wherein the cam profile translates the first pin relative to the first hole as the rotary actuator rotates from the first angular position to the second angular position, wherein the cam profile translates the second pin relative to the second hole as the rotary actuator rotates from the second angular position to the third angular position; and
   an extension spring coupled between the carriage and the rotary actuator, wherein the extension spring is configured to return the rotary actuator to the first angular position.

2. The assembly of claim 1, wherein the carriage includes one or more rollers configured to translate the carriage, wherein each of the first pin, the first compression spring, the second pin, the second compression spring, the rotary actuator, and the extension spring are configured to translate with the carriage.

3. The assembly of claim 1, wherein the carriage includes one or more stops configured to limit the rotation of the rotary actuator.

4. The assembly of claim 3, wherein the rotary actuator includes a tab extending from an outer diameter of the rotary actuators; wherein the tab is configured to interface with the one or more stops by which the one or more stops are configured to limit the rotation of the rotary actuator.

5. The assembly of claim 4, wherein the extension spring is coupled to the tab of the rotary actuator.

6. The assembly of claim 5, wherein the tab defines a hole, wherein the assembly includes a clevis pin disposed in the hole of the tab and coupling the extension spring to the tab.

7. The assembly of claim 1, wherein the rotary actuator is configured to rotate relative to the carriage about a rotational axis; wherein the cam profile causes the first pin and the second pin to translate parallel to the rotational axis.

8. The assembly of claim 7, wherein the rotary actuator is rotatably coupled to the carriage by a bushing and a fastener.

9. The assembly of claim 8, wherein the bushing and the fastener are concentrically mounted to the rotary actuator.

10. The assembly of claim 9, wherein the first pin and the second pin are aligned in series relative to the bushing.

11. The assembly of claim 1, wherein the cam profile includes a first surface, one or more ramps, and a second surface; wherein the first surface is parallel to the second surface; wherein the first surface is offset from the second surface; wherein the one or more ramps couple the first surface with the second surface.

12. The assembly of claim 11, wherein the one or more ramps include a first ramp and a second ramp, wherein the second ramp is angularly offset from the first ramp to cause the first pin and the second pin to be translated by the cam profile at different angular positions of the rotary actuator.

13. The assembly of claim 12, wherein the first pin includes a ramp with a slope matching a slope of the first ramp; wherein the first pin is translated by the ramp of the first pin interfacing with the first ramp of the cam profile; wherein the second pin includes a ramp with a slope matching a slope of the second ramp; wherein the second pin is translated by the ramp of the second pin interfacing with the second ramp of the cam profile.

14. The assembly of claim 1, further comprising a third pin and a third compression spring; the carriage defining a third hole, wherein at least a portion of the third pin is disposed in the third hole, wherein the third compression spring is coupled between the carriage and the third pin, wherein the third compression spring abuts the third pin against the cam profile, wherein the cam profile translates the third pin relative to the third hole as the rotary actuator rotates from the third angular position to a fourth angular position.

15. The assembly of claim 1, wherein the cable includes a fitting at an end of the cable; wherein the rotary actuator defines a radial groove and a slot; wherein the fitting is inserted in the slot such that the cable is coupled to the rotary actuator; wherein the cable is configured to uncouple from the rotary actuator by removing tension from the cable and removing the fitting from the slot.

16. A system comprising:
   an assembly including:
      a carriage defining a first hole and a second hole;
      a rotary actuator rotatably coupled to the carriage by which the rotary actuator is configured to rotate relative to the carriage between a first angular position, a second angular position, and a third angular position, wherein the rotary actuator includes a cam profile;
      a first pin, wherein at least a portion of the first pin is disposed in the first hole;

a first compression spring coupled between the carriage and the first pin, wherein the first compression spring abuts the first pin against the cam profile;

a second pin, wherein at least a portion of the second pin is disposed in the second hole;

a second compression spring coupled between the carriage and the second pin, wherein the second compression spring abuts the second pin against the cam profile;

a cable coupled to the rotary actuator, wherein the cable causes the rotary actuator to rotate between the first angular position, the second angular position, and the third angular position, wherein the cam profile translates the first pin relative to the first hole as the rotary actuator rotates from the first angular position to the second angular position, wherein the cam profile translates the second pin relative to the second hole as the rotary actuator rotates from the second angular position to the third angular position; and an extension spring coupled between the carriage and the rotary actuator, wherein the extension spring is configured to return the rotary actuator to the first angular position;

a lever coupled to the cable;

a seat member;

at least a first sheet and a second sheet; and a deformable member coupled between the seat member and the carriage, wherein the deformable member is configured to deform for attenuating energy as the carriage translates downwards relative to the seat member.

17. The system of claim 16, wherein the first pin is configured to engage the first sheet when the rotary actuator is in the second angular position and the third angular position; wherein the second pin is configured to engage the second sheet when the rotary actuator is in the third angular position; wherein the carriage is configured to translate the first sheet by way of the first pin and translate the second sheet by way of the second pin causing the first sheet and the second sheet to decrease a bend radius of the deformable member.

18. The system of claim 16, wherein the lever is configured to translate the cable causing the cable to rotate the rotary actuator between the first angular position, the second angular position, and the third angular position.

19. The system of claim 16, wherein the carriage is configured to translate along one or more channels of the seat member.

20. The system of claim 16, wherein the cam profile includes a first surface, one or more ramps, and a second surface; wherein the first surface is parallel to the second surface; wherein the first surface is offset from the second surface; wherein the one or more ramps couple the first surface with the second surface.

* * * * *